United States Patent
Park et al.

(10) Patent No.: US 12,556,042 B2
(45) Date of Patent: Feb. 17, 2026

(54) DETERMINING AND COMMUNICATING RECHARGING TIME OF AN ENERGY HARVESTING DEVICE

(71) Applicant: SHARP KABUSHIKI KAISHA, Sakai (JP)

(72) Inventors: Kenneth James Park, Cathlamet, WA (US); Tomoki Yoshimura, Camas, WA (US); Atsushi Ishii, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/430,575

(22) Filed: Feb. 1, 2024

(65) Prior Publication Data

US 2025/0253716 A1    Aug. 7, 2025

(51) Int. Cl.
*H02J 50/80* (2016.01)
*H02J 7/34* (2006.01)
*H02J 50/00* (2016.01)

(52) U.S. Cl.
CPC ............ *H02J 50/80* (2016.02); *H02J 50/001* (2020.01); *H02J 7/345* (2013.01)

(58) Field of Classification Search
CPC ................................ H02J 50/001; H02J 50/80
See application file for complete search history.

(56) References Cited

U.S. PATENT DOCUMENTS

| 2015/0128733 A1* | 5/2015 | Taylor | G01D 11/00 73/865.8 |
| 2022/0352751 A1* | 11/2022 | Elshafie | H02J 50/23 |
| 2024/0064672 A1* | 2/2024 | Zhang | H04W 56/003 |
| 2024/0088713 A1* | 3/2024 | Youn | H04B 5/263 |
| 2024/0430934 A1 | 12/2024 | Fujishiro et al. | |

FOREIGN PATENT DOCUMENTS

WO    2023/167225 A1    9/2023

* cited by examiner

*Primary Examiner* — Rexford N Barnie
*Assistant Examiner* — Joseph N Inge
(74) *Attorney, Agent, or Firm* — ScienBiziP, P.C.

(57) ABSTRACT

An energy harvesting electronic device that includes an energy storage device and a processor is provided. The processor is configured to determine that the electronic device has a first message to transmit to another electronic device. The processor determines that the device has enough energy required for transmitting the first message and a first amount of time required for the energy storage device to store an amount of energy required for receiving a second message after transmitting the message. The processor includes a value in the first message that is at least equal to the first amount of time when the first amount of time is greater than zero. The processor includes an indication in the first message that the electronic device has enough energy required for receiving the second message when the first amount of time is zero. The processor transmits the first message to the other electronic device.

15 Claims, 16 Drawing Sheets

DETERMINING AND COMMUNICATING RECHARGING TIME OF AN ENERGY HARVESTING DEVICE

TECHNICAL FIELD

The technology generally relates to wireless communications, and more particularly, to determining and communicating recharging time of an energy harvesting device in a wireless network.

BACKGROUND

One of the three fundamental use cases for development of the 3rd Generation Partnership Project 5th Generation Mobile Network (3GPP 5G) technologies is Narrowband Internet of Things/machine type communications (NB-IoT/MTC). The NB-IoT is a standards-based low power wide area (LPWA) technology that is developed to enable a wide range of new IoT devices and services. NB-IoT significantly improves the power consumption of user devices, system capacity, and spectrum efficiency, especially in deep coverage.

Some of the IoT devices may achieve a battery life of more than 10 years, which may be desirable in a wide range of use cases. New physical layer signals and channels are designed for 3GPP New Radio (NR) to meet the demanding requirements of extended coverage (e.g., for rural and deep indoors applications) and ultra-low device complexity. The initial cost of the NB-IoT devices is expected to be a significant market driver for the uptake of this technology. The underlying technology of the NB-IoT devices is, however, much simpler than the existing solutions and its cost is expected to decrease rapidly as the demand increases.

The MTC, also referred to as machine to machine (M2M), represents the broad area of wireless communication with sensors, actuators, physical objects, and other devices that are not directly operated by humans. The MTC communication denotes a data channel between two entities without the involvement of a human. This communication is typically between an MTC device and an MTC server. A prime example of the MTC communication is the smart metering for utility services, such as gas, water, and electricity. The MTC communication may also be between different MTC devices (e.g., IoT devices), without the involvement of an MTC server.

An ambient power-enabled Internet of Things (ambient power-enabled IoT or AIoT) device is an IoT device that is powered by energy harvesting. The harvested power may be obtained from the energy that is inherently available in the device's environment. Typically, an energy harvesting wireless terminal may not have a conventional battery, and the device may use energy that is harvested from the environment in lieu of a dedicated internal power source.

Such a device may be capable of either harvesting, storing, and subsequently using, or harvesting and immediately using, energy from wireless radio waves or any other form of energy that may be locally obtained to meet the needs of a particular application. For example, in some scenarios, an AIoT device may harvest energy from radio waves that may come from the 5G NR network entities (e.g., a next-generation Node B (gNB), customer premise equipment (CPE), etc.) or from user equipment (e.g., handheld devices, IoT devices, etc.). In some other scenarios, an AIoT device may harvest energy from solar, light, motion/vibration, heat, pressure, or any other potential energy sources.

The 3GPP (e.g., as indicated in Release 19 (Rel-19) of 3GPP Services and System Aspects (SA) Working Group 1 (WG1) (more commonly known as SA1)) has conducted an overall service description (e.g., in a stage 1 level study) on the support of ultra-low power applications. In the ultra-low power applications, the power requirements of a device may be satisfied from local energy harvesting by the device. For example, a device may include no battery and may derive sufficient operating energy from the local environment. The energy may be used either immediately or may be stored (e.g., in a capacitor of the device) for later use. The study was preceded by an agreement in SA1 of a Work Item Description (WID) document. That document provides the justification of the work and an outline of the scope of the work that is expected to take place with respect to developing a Technical Report (TR). The latest revision of the WID may be found in SP-220085.

The results of the SA1 stage 1 study that was concluded in December 2022 were published in TR 22.840 v1.0.0 and the normative work was concluded in November of 2023. The study covers use cases, such as traffic scenarios and device constraints of AIoT devices. The study identified new potential service requirements as well as new key performance indicators (KPIs), as related to 3GPP NR type devices, access network, and core network.

Massive MTC (mMTC) is one important use case for 5G that has been discussed in the WID. However, there are still several important use cases and scenarios that are not adequately covered by 3GPP Rel-18 technologies. These uses cases include ultra-low complexity devices, very small device size/form factor (e.g., thickness of mm) devices, maintenance-free (e.g., no need to replace a conventional battery for the device) devices, device longer life cycle, and device deployment, where a conventional battery is not applicable.

To address, at least, the above-described use cases, the SA1 has conducted a study on IoT services using an IoT device powered by energy harvesting, where such a device may support IoT communications without relying on conventional power source and/or avoiding human intervention for recharging or replacing. The study results may be found in SP-231405 and the resulting technical specification may be found in TS 22.369. In addition to the low power consumption of such an AIoT device, the study also considers low device complexity, small device size, and a device with a long-life cycle.

Some of the potential challenges of AIoT devices may include: an extremely low complexity device form factor, the ability to harvest energy and, at the same time, use the harvested energy to support communication, the capability to provide sufficient communication services to fulfil the corresponding requirements, the capability to provide user privacy, and the capability to provide data security.

In many use cases, the life cycle of an AIoT device may need to be properly managed, so as to meet user and institutional expectations. For example, when an AIoT device is deployed to track an item in a warehouse, the device may only be intended to be used when the tracked item is being transferred, stored, loaded/unloaded, and/or inventoried in the warehouse. Then, subsequent to its use in the warehouse, the device may be discarded. Thus, in the interests of protecting the privacy and security of information that may be retained on the device, the device may not be allowed access to, or to be accessed by, the 5GS when the device has come to the end of its intended use. In addition, the device may not be allowed access to, or to be accessed by, the 5GS when the device has come to an end of its intended use in order to avoid interference with other devices that may be using resources of the 5G system (5GS), such as Radio Frequency (RF) resources.

The 3GPP (e.g., as indicated in TS22.369) defines the communication aspects of an AIoT device, as a functional service requirement, as follows. The 5G system shall be able to support 5G networks or an Ambient IoT capable UE, to communicate with a group of Ambient IoT devices simultaneously. The 5G network shall support a mechanism to authorize an Ambient IoT capable UE to communicate with an Ambient IoT device. The 5G system shall be able to support mechanisms to communicate between an Ambient IoT device and the 5G network using Ambient IoT direct network communication or Ambient IoT indirect network communication, or between an Ambient IoT device and Ambient IoT capable UE using Ambient IoT device to UE communication. Examples of the communication between 5G network/Ambient IoT capable UE and Ambient IoT devices can include periodic sensor reporting or network-initiated inventory. The 5G system shall provide suitable mechanisms to support communication between a trusted and authorized 3rd party and an Ambient IoT device or a group of Ambient devices.

SUMMARY

In a first aspect of the present application, an energy harvesting electronic device is provided. The electronic device includes an energy storage device configured to store energy harvested by the electronic device. The electronic device further includes one or more non-transitory computer-readable media storing one or more computer-executable instructions and at least one processor coupled to the one or more non-transitory computer-readable media. The at least one processor is configured to execute the one or more computer-executable instructions to cause the electronic device to determine that the electronic device has a first message to transmit to another electronic device; determine that the energy storage device has enough energy required for transmitting the first message; determine a first amount of time required for the energy storage device to store an amount of energy required for receiving a second message after transmitting the first message; include, in a case that the first amount of time is greater than zero, a value in the first message that is at least equal to the first amount of time; include, in a case that the first amount of time is zero, an indication in the first message that the electronic device has enough energy required for receiving the second message; and transmit the first message to the other electronic device.

In an implementation of the first aspect, the electronic device includes receiver circuitry. The at least one processor is further configured to execute the one or more computer-executable instructions to cause the electronic device to disable the receiver circuitry for at least the first amount of time in the case that the first amount of time is greater than zero.

In another implementation of the first aspect, including the value that is at least equal to the first amount of time in the first message includes selecting, from several enumerated time values, an enumerated time value that is at least equal to the first amount of time; and setting several bits in the first message to indicate the selected enumerated time value.

In another implementation of the first aspect, including the indication in the first message that the electronic device has enough energy required for receiving the second message includes not including any of the several bits in the first message.

In another implementation of the first aspect, including the indication in the first message that the electronic device has enough energy required for receiving the second message includes selecting an enumerated time value from the several enumerated time values that includes a zero amount of time; and setting the several bits in the first message to indicate the selected enumerated time value.

In another implementation of the first aspect, the several bits is a first set of bits, the selected enumerated time value is a first enumerated time value, the several enumerated time values is a first set of enumerated time values, and the at least one processor is further configured to execute the one or more computer-executable instructions to cause the electronic device to determine a second amount of time required for the energy storage device to store an amount of energy required for transmitting a third message after transmitting the first message; select a second enumerated time value from a second set of enumerated time values that is at least equal to the second amount of time; set a second set of bits in the first message to indicate the second enumerated time value. Transmitting the first message to the other electronic device includes determining whether prioritization is required for transmitting the first and second set of bits; in a case that prioritization is required, removing the second set of bits from the first message prior to transmitting the first message; and in a case that prioritization not required, leaving the second set of bits in the first message.

In another implementation of the first aspect, the several enumerated time values are configured to the electronic device at a time of manufacturing the electronic device.

In another implementation of the first aspect, the at least one processor is further configured to execute the one or more computer-executable instructions to cause the electronic device to receive a configuration message that includes updated values for the several enumerated time values.

In another implementation of the first aspect, the at least one processor is further configured to execute the one or more computer-executable instructions to cause the electronic device to determine a second amount of time required for the energy storage device to store an amount of energy required for transmitting a third message after transmitting the first message; in a case that the second amount of time is greater than zero, include a value that is at least equal to the second amount of time in the first message; and in a case that the second amount of time is zero, include an indication in the first message that the electronic device has enough energy required for transmitting the third message after receiving the second message.

In another implementation of the first aspect, the electronic device further includes transmitter circuitry. The at least one processor is further configured to execute the one or more computer-executable instructions to cause the electronic device to disable the transmitter circuitry for at least the second amount of time in the case that the second amount of time is greater than zero.

In another implementation of the first aspect, including the value that is at least equal to the second amount of time in the first message includes selecting, from several enumerated time values, an enumerated time value that is at least equal to the second amount of time; and setting several bits in the first message to indicate the selected enumerated time value.

In another implementation of the first aspect, including the indication in the first message that the electronic device has enough energy required for transmitting the third message after transmitting the first message includes not including any of the several bits in the first message.

In another implementation of the first aspect, including the indication in the first message that the electronic device has enough energy required for transmitting the third message after transmitting the first message includes selecting an enumerated time value from the several enumerated time values that indicates a zero amount of time; and setting the several bits in the first message to indicate the selected enumerated time value.

In another implementation of the first aspect, the energy storage device includes a capacitor. The electronic device is an AIoT device. The other electronic device is one of a base station (BS) and a user equipment (UE). The other electronic device is configured not to transmit any messages to the energy harvesting electronic device for at least the first amount of time in the case that the first amount of time is greater than zero.

In a second aspect of the present application, a method is provided. The method includes determining that an energy harvesting electronic device that includes an energy storage device has a first message to transmit to another electronic device; determining that the energy storage device has enough energy required for transmitting the first message; determining a first amount of time required for the energy storage device to store an amount of energy required for receiving a second message after transmitting the first message; in a case that the first amount of time is greater than zero, including a value that is at least equal to the first amount of time in the first message; in a case that the first amount of time is zero, including an indication in the first message that the electronic device has enough energy required for receiving the second message; and transmitting the first message to the other electronic device.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
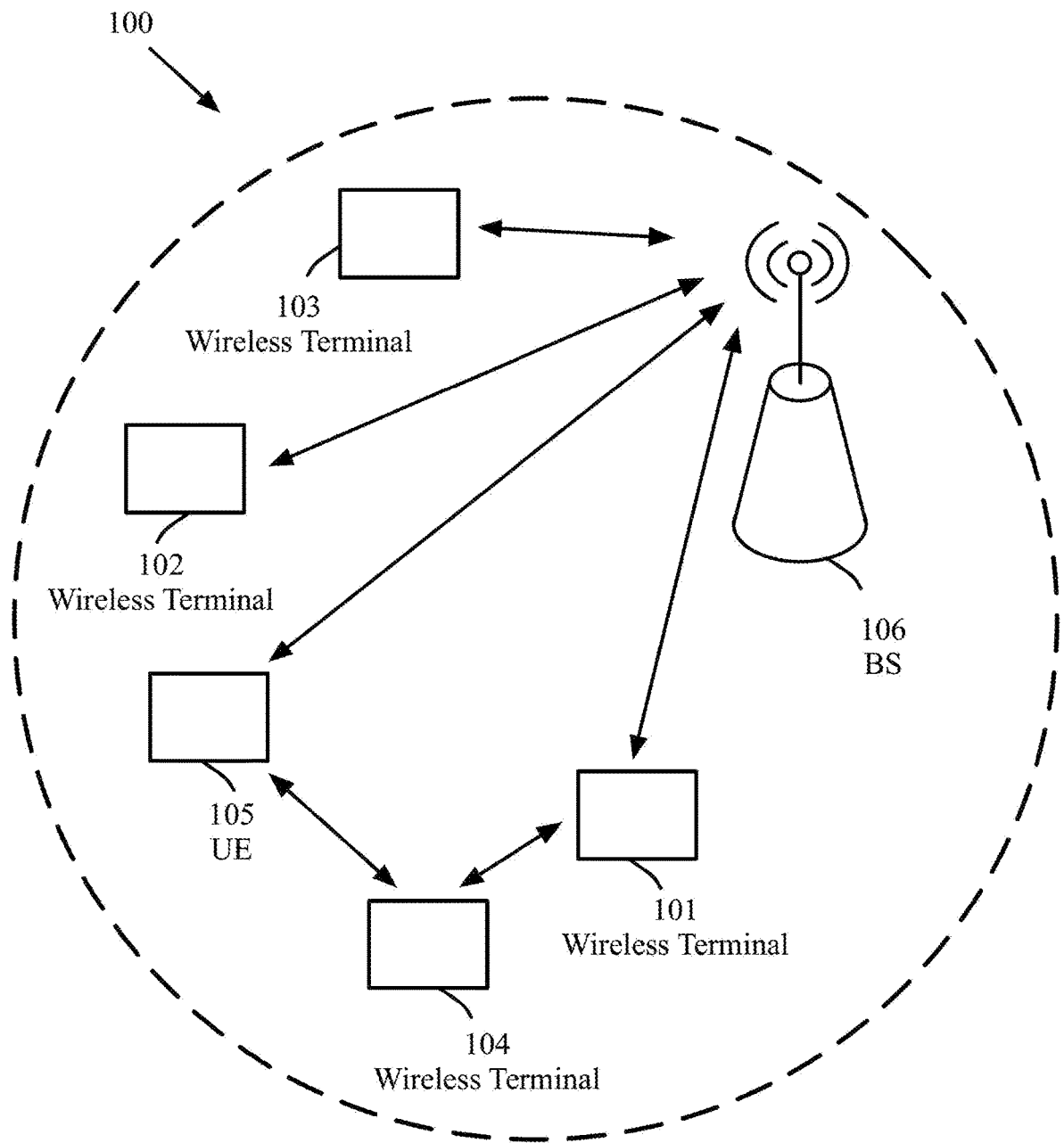
FIG. 1 is a schematic diagram illustrating a wireless communication system, according to an example implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not shown) by the same numerals in the example figures. However, the features in different implementations may differ in other respects, and thus may not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series, and the equivalent. In addition, the terms "system" and "network" herein may be used interchangeably.

As used herein, the term "and/or" should be interpreted to mean one or more items. For example, the phrase "A, B and/or C" should be interpreted to mean any of only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

Additionally, for the purposes of explanation and non-limitation, specific details, such as functional entities, techniques, protocols, standard, and the like are set forth for providing an understanding of the described technology. In other examples, detailed descriptions of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software, or a combination of software and hardware. Described functions or algorithms may correspond to modules which may be software, hardware, firmware, or any combination thereof. The software implementation may include computer executable instructions stored on a computer-readable medium, such as a memory or other types of storage devices. For example, one or more microprocessors or general-purpose computers with communication processing capability may be programmed with corresponding executable instructions and carry out the described network function(s) or algorithm(s). The microprocessors or general-purpose computers may be formed of one or more Application-Specific Integrated Circuits (ASICs), programmable logic arrays, and/or one or more Digital Signal Processor (DSPs). Although some of the example implementations described in this specification are oriented to software installed and executing on computer hardware, nevertheless, alternative example implementations implemented as firmware, as hardware, or as a combination of hardware and software are well within the scope of the present disclosure.

The computer-readable medium includes, but is not limited to, Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, an LTE-Advanced Pro system, or a 5G NR Radio Access Network (RAN)) typically includes at least one base station (BS), at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more BSs.

It should be noted that, in the present application, a UE (or a terminal device) may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A BS may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, cLTE (evolved LTE, e.g., LTE connected to 5GC), NR (often referred to as 5G), and/or LTE-A Pro. However, the scope of the present application should not be limited to the above-mentioned protocols.

A BS may include, but is not limited to, a node B (NB) as in the UMTS, an evolved node B (eNB) as in the LTE or LTE-A, a radio network controller (RNC) as in the UMTS, a BS controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The BS may be operable to provide radio coverage to a specific geographical area using several cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the DL and optionally the UL resources to at least one UE within its radio coverage for DL and optionally UL packet transmission). The BS may communicate with one or more UEs in the radio communication system through the cells.

A cell may allocate sidelink (SL) resources for supporting Proximity Service (ProSe) or V2X services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), mMTC, Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, and the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise, the term Special Cell may refer to the PCell. A Special Cell may support a Physical Uplink Control Channel (PUCCH) transmission and contention-based Random Access and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

FIG. 1 is a schematic diagram illustrating a wireless communication system 100, according to an example implementation of the present disclosure. In FIG. 1, the wireless communication system 100 includes the wireless terminals 101-104, the UE 105, and the BS 106. The terms base station device, base station, and BS herein may be used interchangeably.

The BS 106 may communicate with one or more wireless terminals, such as wireless terminals 101-103 and the UE 105, through one or more cells. A cell is defined as a set of resources used for a wireless communication. A cell may include one or both of a downlink component carrier and an uplink component carrier. A downlink component carrier and an uplink component carrier may also be referred to as component carriers.

The wireless terminals 101-104 may be energy harvesting wireless terminals. Some of the energy harvesting wireless terminals may be of such limited capability that they may have minimal or no capacity to receive DL signals from the BS 106 (or transmit UL signals to the BS 106). In the example of FIG. 1, the wireless terminals 101-103 may be able to generate enough power, and/or may be in close vicinity of the BS 106, that may be able to communicate directly (e.g., though UL and/or DL signals) with the BS. The wireless terminal 104, on the other hand, may be able to directly communicate with the UE 105 or with another wireless terminal device 101 (e.g., through SL signals) without the participation of the BS 106 in the transmission and reception of data traffic.

The wireless terminals 101-104 may be AIoT devices that harvest energy from radio waves, solar, light, motion, vibration, heat, pressure, or any other power sources. The energy harvesting by a wireless terminal device may be continuous or incidental. It is also possible that the network controls when or where some forms of harvestable power, such as radio waves, are provided. An energy harvesting wireless terminal may not always have enough power to initiate or receive communication.

The operation of a battery-less energy harvesting wireless terminal (e.g., the activation and operation of the energy harvesting wireless terminal's microprocessor and other device components dependent upon the microprocessor's operation) may be dependent upon a harvestable energy source that is immediately available to the device and of a duration sufficient to power the device to the completion of its intended operational time frame.

An energy harvesting wireless terminal may have limited energy storage capability (e.g., a capacitor) in which case the operation of the device may be independent of an immediate availability and/or temporal harvestable energy source, and the device may store the harvested energy when available and use the stored energy as needed and as sufficient to power the device for a duration that is necessary to complete the device's intended operational time frame.

The energy harvesting wireless terminal may have low complexity, small size and lower capabilities and lower power consumption than previously defined 3GPP IoT devices (e.g., NB-IoT/enhanced Machine Type Communication (eMTC) devices). The energy harvesting wireless terminal may be maintenance free and may have long life span (e.g., more than 10 years). However, the life span of an energy harvesting wireless terminal may also be relatively short, such as, when tracking a package through a logistics chain.

The low complexity of an energy harvesting wireless terminal may be reflected in the energy harvesting wireless terminal's efficient use of 3GPP UL and DL time and frequency resources when communicating with a BS or when communicating with other devices capable of using 3GPP UL and DL time and frequency resources. The low complexity of an energy harvesting wireless terminal may be reflected in a BS's efficient use of 3GPP UL and DL time and frequency resources when communicating with an energy harvesting wireless terminal. The energy harvesting wireless terminals may have low data usage. Generally, energy harvesting wireless terminal data transmissions may contain only a few hundred bits of data.

As discussed above, such energy harvesting wireless terminals lead to new functional and performance requirements to a 5G system. Specifically, the energy harvesting wireless terminals use cases require new functional requirements, for example, communication aspects of energy harvesting wireless terminals and network, positioning of energy harvesting wireless terminals, management of energy harvesting wireless terminals, exposure of related network capabilities, of data collected by the energy harvesting wireless terminals and of information about the energy harvesting wireless terminals, charging, security, and privacy. The implementations provided in this disclosure discuss efficient communication mechanisms between such wireless terminals the require minimum power for signal transmission and/or reception.

Nr Frame Structure

The 5G NR Frame structure is described in the NR 3GPP standards (e.g., Technical Specification (TS) 38.211). The 5G NR frame structure includes subframes, slots, and symbol configurations. As described above, the 5G NR supports two frequency ranges: FR1 (which is under 7.125 gigahertz (GHz)) and FR2 (also known as millimeter wave range, which is between 24.25 GHZ to 71.2 GHZ). NR uses flexible subcarrier spacing derived from basic 15 kilohertz (kHz) subcarrier spacing that is also used in the LTE. A frame may have a duration of 10 milliseconds (ms) which may include 10 subframes each having 1 ms duration, which is similar to the LTE networks. Each subframe may have $2^u$ slots (u being a member of the set of [0.4]). Each slot may typically include 14 OFDM symbols. The number of symbols, however, may depend upon the start and length indicator value (SLIV). The radio frames of 10 ms may be transmitted continuously one after the other as per Time Division Duplex (TDD) or Frequency Division Duplex (FDD) topology. A subframe may be of a fixed duration (e.g., 1 ms) whereas a slot's length may vary based on a subcarrier spacing (SCS) and the number of slots per subframe. A slot is 1 ms for 15 kHz, 500 us for 30 kHz, and so on. The subcarrier spacing of 15 kHz may occupy one slot per subframe, whereas the subcarrier spacing of 30 kHz may occupy two slots per subframe, and so on. Each slot may occupy either 14 OFDM symbols or 12 OFDM symbols, depending on the normal cyclic prefix (CP) or extended CP, respectively.

It should be noted that even though for the remainder of this disclosure, a 14-symbol configuration that is based on a normal CP is discussed, a 12-symbol configuration that is based on an extended CP may not be precluded from the solution space.

In 5G, a resource element (RE) is the smallest physical resource in NR which may include one subcarrier during one OFDM symbol. Also, in 5G, one NR Resource Block (RB) may contain 12 subcarriers in the frequency domain, irrespective of the numerology, and is defined only in the frequency domain (e.g., the bandwidth may not be fixed and may be dependent upon the configured subcarrier spacing). Additionally, in 5G, Physical Resource Blocks (PRBs) are the RBs that are used for actual/physical transmission/reception.

NR Numerology

Figure 2:
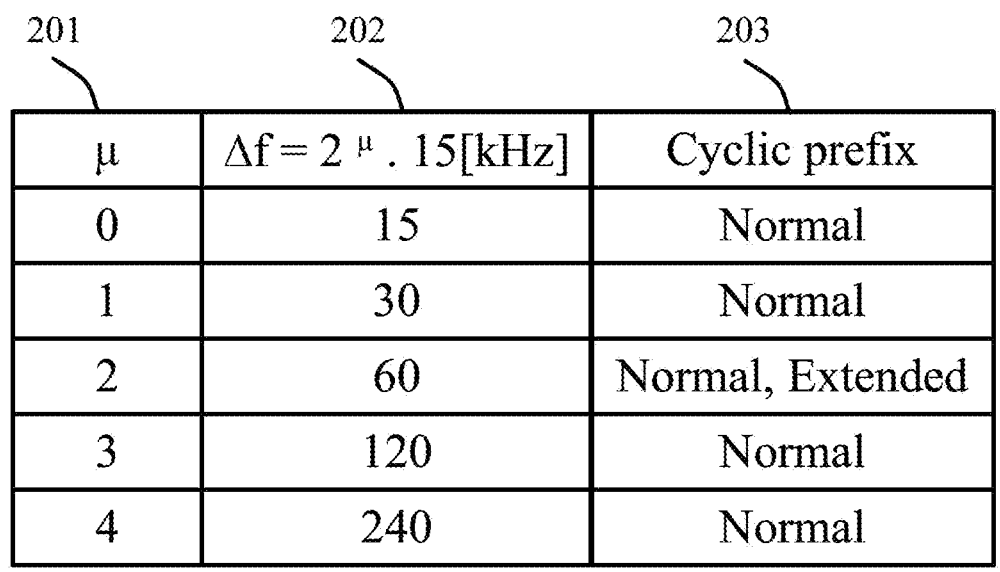
FIG. 2 is a diagram illustrating parameters related to subcarrier spacing, according to an example implementation of the present disclosure.

Numerology is a term used in the 3GPP specification to describe the different subcarrier spacing types. FIG. 2 is a diagram illustrating parameters related to subcarrier spacing (SCS), according to an example implementation of the present disclosure. The figure shows several different types of subcarrier spacing (which are similar to the Table 4.2-1 in TS 38.211) that defines the supported transmission numerologies. With reference to FIG. 2, $\Delta f$ 202 is subcarrier spacing. The subcarrier spacing configuration u 201 and the cyclic prefix 203 for a downlink or uplink bandwidth part may be obtained from the higher-layer parameters subcarrierSpacing and cyclicPrefix, respectively.

It should be noted that for the remainder of this disclosure, the terms numerology and SCS may be used interchangeably. It should also be noted that the term "SCS configuration factor n" may be used to refer to a subcarrier spacing type, where n may belong to the set [0,1,2,3,4], as noted in the table of FIG. 2 and is referred to as $\mu$ 201.

Energy Harvesting Limitations of an AIOT Device

As identified by the 5GS, (e.g., by section 5.2.1 of TS22.369), communication between 5G network/Ambient IoT capable UE and Ambient IoT devices may include periodic sensor reporting or network-initiated inventory. The communication between an AIoT device and the network may be driven by events (e.g., mobile originated messaging) at the device or by events (e.g., mobile terminated messaging) at the BS (e.g., the gNB). In either case, it is not expected that there may be any coordination between the device originated messaging and the network originated messaging. Therefore, it may be assumed that the duration between any two-message traffic is non-deterministic.

It is expected that the period, in which the network (or other devices capable of transmitting/receiving AIoT communications) may attempt to communicate with an AIoT device, may be a function of the network's needs to access an AIoT device for the purposes, such as sending the device configuration data (e.g., data controlling the device's operation), sending the device user data (e.g., data controlling the operation of sensors on the device), acquiring from the device, the device's operational data (e.g., device status data), or acquiring from the device, the device's user data (e.g., sensor output data), or all of the above.

It is also expected that the period, in which an AIoT device may attempt to communicate with the network (or other device capable of transmitting/receiving AIoT communications), may be a function of at least three aspects related to the AIoT device's operation. The first aspect may be the AIoT device's need to access the network for the purposes of sending the device status data (e.g., data representing the device's operation), sending the device user data (e.g., data representing the operation of sensors on the device), acquiring from the network the device's operational data (e.g., device configuration data), or acquiring from the network the device's user data (e.g., sensor configuration data), or all of the above.

The second aspect may be that the AIoT device has sufficient energy available to operate its receiver and associated circuitry. The third aspect may be that the AIoT device has sufficient energy available to operate its transmitter and associated circuitry at a certain transmitter power level, such as one complete data object transmission at TxMin, where the TxMin is the minimum power at which a wireless terminal transmits, as symbol(s), such that a wireless terminal that receives the symbol(s) may exceed a signal detection threshold for correctly decoding the symbol(s).

It should be noted that the term "certain transmitter power level" is used herein to indicate the output power level of the device's transmitter when averaged over the duration of time and frequency resources used to transport a message output by the device.

As described above, the energy used to operate an AIoT device may be derived (e.g., harvested) from the environment in which the device is operating. As the environmentally derived energy source may be intermittent, and generally outside of the control of the AIoT device, the opportunities for the device to harvest energy from the environment is generally non-deterministic between any two-energy harvesting opportunities. As the duration of the environmentally derived energy source may be brief, the quantity of the harvested energy may be minimal.

Therefore, for each brief and intermittent energy harvesting opportunity, the AIoT device may only be able to acquire a fraction of the energy necessary to facilitate the successful transmission of one complete data object at a certain transmitter power level. Therefore, to accumulate sufficient energy, as necessary to facilitate the successful transmission of one complete data object at a certain transmitter power level, the AIoT device may store the harvested energy from each energy harvesting opportunity into an energy storing device, such as a capacitor.

Once the AIoT device has stored sufficient energy in its capacitor (e.g., by the operations of the device's ambient energy harvesting mechanism) to facilitate the transmission of one complete data object at a certain transmitter power level, the AIoT device may be capable of establishing a communication channel with a BS, such as a gNB, (e.g., to respond to requests from a gNB to establish communication or originate a communication with the gNB). However, such communications may result in the AIoT device using a significant amount of the energy available in its power storage capacitor to accomplish the transmission of at least one complete data object at a certain transmitter power level.

If the AIoT device were to use nearly all the energy available in its capacitor (e.g., after transmitting at least one complete data object at a certain transmitter power level), the AIoT device's reserve energy capacity may be such that the AIoT device may not be able to transmit another data object at a certain transmitter power level, for example, until the energy stored in the capacitor is restored at a threshold that may be sufficient to facilitate a complete transmission of at least one data object at a certain transmitter power level.

Communication Sessions while AIOT Device has Insufficient Power to Successfully Communicate As noted above, the time required to harvest sufficient energy to charge a capacitor to a certain threshold that may support a complete data object transmission at a certain transmitter power level may be non-deterministic. As such, the time between at least two consecutive communications between a BS (e.g., a gNB) and an AIoT device is also non-deterministic if the energy level of the capacitor were to fall below a threshold that may be sufficient to facilitate a complete transmission of at least one data object at a certain transmitter power level following the transmission of a first data object.

A Communication Session that is Originated by a BS

During the above-described non-deterministic period, the AIoT device may be recharging its capacitor with each energy harvesting opportunity. However, if the AIoT device were to receive a communication, such as a request message, from the BS (e.g., a gNB), during the period of recharging its capacitor, by attempting to receive the message and decoding the message, the device may use some of the energy stored in the capacitor to operate the device's receiver and processor to decode the request message received from the BS.

In a first case, the energy of the AIoT device's capacitor may be below the level of a first threshold, such that the device may not be able to fully operate the receiver to receive the request message, nor operate the processor to decode the request message (e.g., transmitted by the BS), nor be able to transmit a complete data object at a certain transmit power level in response to the request message received from the BS. In such a case, any energy used by the AIoT device in such an effort is wasted as the request message may not be correctly received by the device.

In a second case, the energy of the capacitor may be above the level of the first threshold, but below the level of the sum of the first threshold and a second threshold (e.g., the second threshold being an amount of power required to transmit a message at a certain power level), such that the device may be able to fully operate the receiver to receive the request message and operate the processor to decode the request message transmitted by the BS, but may not be able to transmit a complete data object at a certain transmit power level in response to the request message received from the BS. In this case, any energy used by the AIoT device in such an effort may be wasted as the request message may not be decoded by the device.

In a third case, the energy of the capacitor may be above the level of the sum of the first threshold and the second threshold, such that the device may be able to fully operate the receiver to receive the request message, operate the processor to decode the request message transmitted by the BS, and transmit a complete data object at a certain transmit power level in response to a request message received from the BS. In this case, any energy used by the AIoT device in such an effort is not wasted as the AIoT device's response message to the request message may be fully received by the BS.

A Communication Session that is Originated by the Device

During a non-deterministic period, the AIoT device may be recharging its capacitor with each energy harvesting opportunity. However, if the AIoT device were to transmit a message to the BS during this period of recharging its capacitor and attempt to encode the message and transmit the message, the device may use some of the energy stored in the capacitor to operate its processor to encode the message and operate its transmitter to transmit the message to the BS.

In a first case, the energy level of the capacitor may be below a first threshold, such that the device may not be able to operate the processor to encode the message to the AIoT nor fully operate the transmitter to transmit the message to the BS. In such a case, any energy used by the AIoT device in such an effort is wasted as the message cannot be effectively transmitted by the device and thus not correctly received and acted upon by the BS.

In a second case, the energy level of the AIoT device's capacitor may be above the first threshold plus a second threshold, such that the device may be able to operate the processor to encode the message for transmission to the BS and may be able to fully operate its transmitter to transmit a complete data object at a certain transmit power level. In this case, any energy used by the AIoT device in such an effort is not wasted as the AIoT device's message to the BS may be fully received by the BS.

Therefore, as described below, some embodiments may provide an AIoT device that determines the amount of energy that is generated by the operation of energy harvesting mechanism(s) of the device and stored into the device's energy storage capacitor. The determination of such energy generated by a harvesting mechanism may be accomplished by, for example, a Coulomb counter circuit.

The AIoT device may track the amount of energy that has been generated by the operation of the energy harvesting mechanism(s) and stored into the device's energy storage capacitor over time. The tracking of such energy generated and stored over time may be accomplished by a process running on the device's processor that takes into account at least the output of the Coulomb counter, as a result of the energy harvesting mechanism(s) operation events and the time between such energy harvesting events.

The device may determine the amount of energy that is consumed by the operation of the device (e.g., reception and transmission operations) and removed from the device's energy storage capacitor. The determination of such energy removal by device operations may be accomplished by, for example, a Coulomb counter circuit.

The AIoT device may track the amount of energy that has been removed from the device's energy storage capacitor over time. The tracking of such energy removal over time may be accomplished by a process running on the device's processor that takes into account at least the output of the Coulomb counter as a result of energy usage events and the time between such energy usage events (e.g., an energy usage event may by an operation of the device's transmitter or by an operation of the device's receiver, or other device operation that consumes energy).

The AIoT device may be configured with a set of thresholds that are used by the device to determine whether there is sufficient energy in the energy storage capacitor to operate the device's receiver and/or whether there is sufficient energy in the energy storage capacitor to operate the device's transmitter.

In order to prevent the BS from sending the AIoT device a message during a period in which the device may not have sufficient power to properly receive the message, a set of bits (e.g., of a bitmap) may be provided. The set of bits (or the bitmap) may be included in the last transmission from the AIoT device to the BS. The bits may be encoded to indicate to the BS that the device does not have sufficient energy resources to receive a message following the transmission of the last data object that has been transmitted at a certain transmission power level. The encoding may also represent an estimate of the amount of time (e.g., referred herein as TimeToRecharge_RX or Timer 1) that may take the device to recharge its energy storage capacitor to a certain threshold that may support receiving a message.

In order to prevent the BS from sending the AIoT device a message when the BS does expect a response from the device as a result of receiving the message during a period in which the device may not have sufficient power to properly transmit as response to the received message, a set of bits (e.g., of a bitmap) may be provided. The set of bits may be included in the last transmission from the AIoT device to the BS. The bits may be encoded to indicate to the BS that the device does not have sufficient energy resources to transmit a data object at a certain transmission power level following the transmission of the last data object that has been transmitted at a certain transmission power level. The encoding may also represent an estimate of the amount of time (e.g., referred herein as TimeToRecharge_TX or Timer 2) that may take the device to recharge its energy storage capacitor to a certain threshold that may support a complete data object transmission at a certain transmitter power level.

The BS may deduce the total estimated time required by the AIoT device to recharge its energy storage capacitor to a sufficient level to both receive a first message and transmit a second message by combining the time estimated by the device (e.g., Timer 1) to recharge its energy storage capacitor to a sufficient level to receive a message and the time estimated by the device (e.g., Timer 2) to recharge its capacitor to a sufficient level to transmit a message.

The BS may further deduce the current and future operating states of an AIoT device's receiver and transmitter from a message transmitted by the AIoT device that carries the time estimated by the device (Timer 1) to recharge its energy storage capacitor to a sufficient level to receive a message and the time estimated by the device (Timer 2) to recharge its energy storage capacitor to a sufficient level to transmit a message.

For example, after the BS receives a message from an AIoT device with the time estimated by the AIoT to recharge its energy storage capacitor before it can receive a message, the BS may deduce that the device's receiver may be disable from at least a period of time staring when the message was received until the elapse of time estimated by the AIoT to recharge its energy storage capacitor before it can receive a message.

As another example, after the BS receives a message from an AIoT device with the time estimated by the AIoT to recharge its energy storage capacitor before it can transmit a message, the BS may deduce that the device's transmitter may be disable from at least a period staring when the message was received until the elapse of time estimated by the AIoT to recharge its capacitor before it can transmit a message.

By such deductions at the BS, the AIoT device's transmitter and receiver operation states may be known by both the AIoT device and the BS. In other words, the operational state may be shared by both the BS and the AIoT device. The shared state of the AIoT device's transmitter and receiver provides the technical advantage that the BS may know when it should not send messages to the AIoT device and when it should not expect to receive messages from the AIoT device.

The shared state of the AIoT device's transmitter and receiver may further provide the technical advantage that the AIoT device may know that the gNB may not send messages to the device when the device's receiver is disabled, and that the BS may not expect to receive any messages from the device when the device's transmitter is disabled.

Some implementations of the present disclosure provide for the exchange of data from the AIoT device to the BS (e.g., a gNB) that represents an indication that following the transmission of the current data object, the AIoT device does or does not have sufficient energy resources to receive a subsequent message and or transmit a subsequent data object.

If the AIoT device does not yet have sufficient energy resources to receive a subsequent message, some implementations of the present disclosure include a mechanism for the exchange of data from the AIoT device to the BS to provide an indication that, following the transmission of the current data object, the AIoT device may not be able to receive a subsequent message for at least a given amount of time (e.g., an amount of time that represents an estimation by the device of the time that may take the device to recharge the device's energy storage capacitor to a certain threshold that may support the reception of a message).

If the AIoT device does not yet have sufficient energy resources to transmit a subsequent data object at a certain transmitter power level, some implementations of the present disclosure include a mechanism for the exchange of data from the AIoT device to the BS to provide an indication that following the transmission of the current data object, the AIoT device may not be able to transmit a subsequent data object at a certain transmitter power level for at least a given amount of time (e.g., a given amount of time that represents an estimation by the device of the time it may nominally take to recharge its capacitor to a certain threshold that may support the transmission of a subsequent data object at a certain transmitter power level).

Some implementations of the present disclosure provide for a state machine used by the AIoT device to manage the operational settings of device's transmitter and receiver based on the status of the power that may be provided by the device's power source to operate the transmitter and receiver and other circuitry necessary for the transmission and reception of messages.

Some implementations of the present disclosure provide for a state machine used by the BS to track the operational settings of an AIoT device's transmitter and receiver based on the timers sent from the AIoT device to the BS. There may be a timer related to a period of time following the last message received from the AIoT to indicate an estimated time the AIoT device may require recharging its energy storage capacitor before the AIoT device has sufficient power to operate its receiver. There may be a timer related to a period of time following the last message received from the AIoT device to indicate an estimated time before the AIoT device may recharge its energy storage capacitor before the AIoT device has sufficient power to operate its transmitter.

Some implementations of the present disclosure provide a mechanism to synchronize state machines used by the AIoT device and the BS such that the timing of the transition between states that manage and track the operational state of the transmitter and receiver of the AIoT device may occur at nearly the same time.

Providing the Time Required by the AIOT Device to Recharge to Receive or Transmit a Subsequent Message An IoT device may be configured, at the time of manufacturing or through RRC (re) configuration, with a certain transmitter power level. The IoT device may be configured, at the time of manufacturing or through RRC (re) configuration, with a first threshold. The first threshold may represent a level of power above which the power is sufficient to facilitate the operation of the device's receiver and other internal circuitry related to the receiver's operation to receive a message.

The AIoT device may be configured, at the time of manufacturing or through RRC (re) configuration, with a second threshold. The second threshold may represent a level of power above which the power is sufficient to facilitate the operation of the device's transmitter and other internal circuitry related to the transmitter's operation to transmit a complete data object at a certain transmit power level.

Figure 3A:
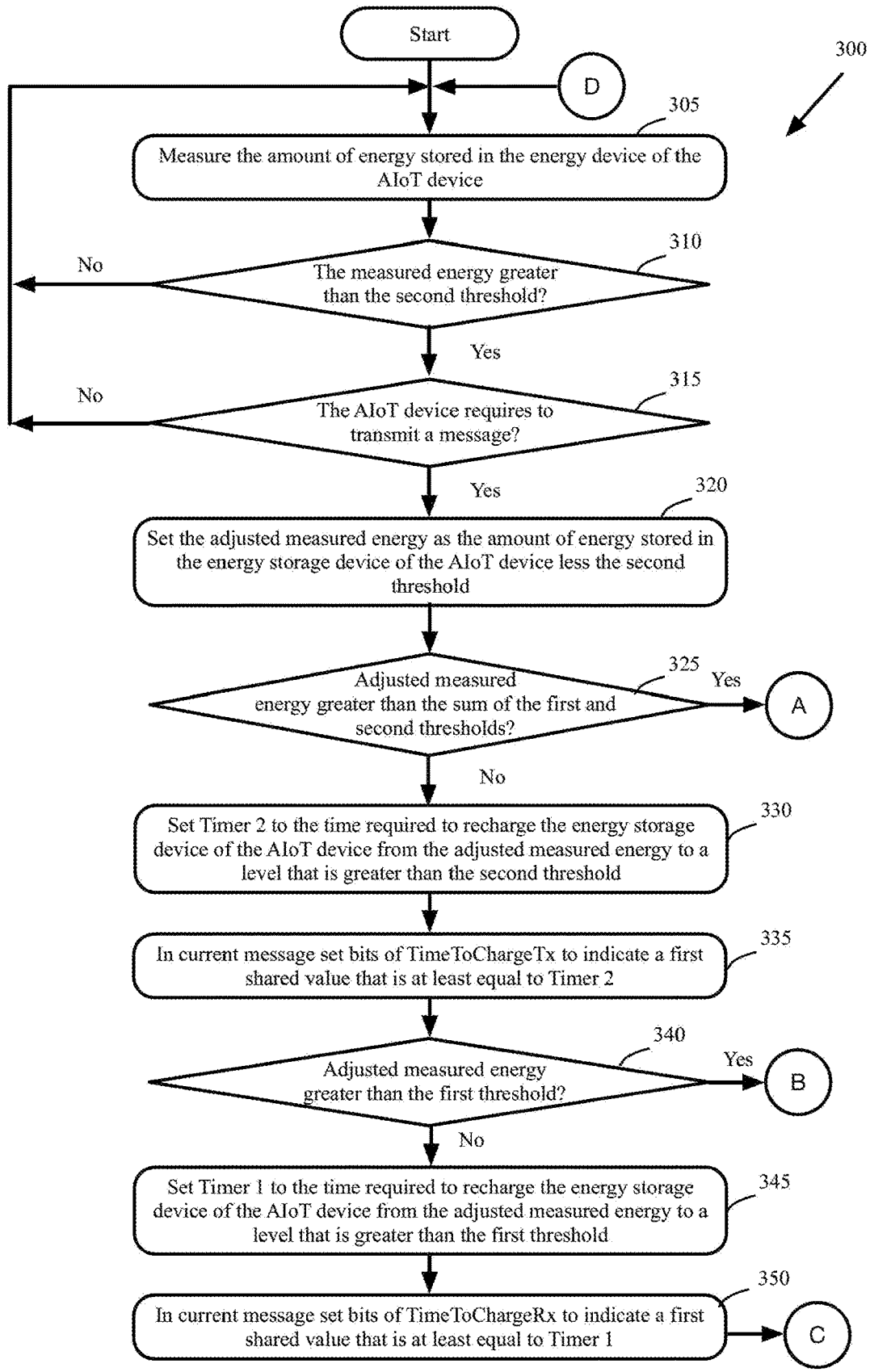
FIGS. 3A-3B illustrates a flowchart of an example method/process performed by an AIoT device to indicate the time required by the AIoT device to recharge to receive or transmit a subsequent message, according to an example implementation of the present disclosure.
Figure 3B:
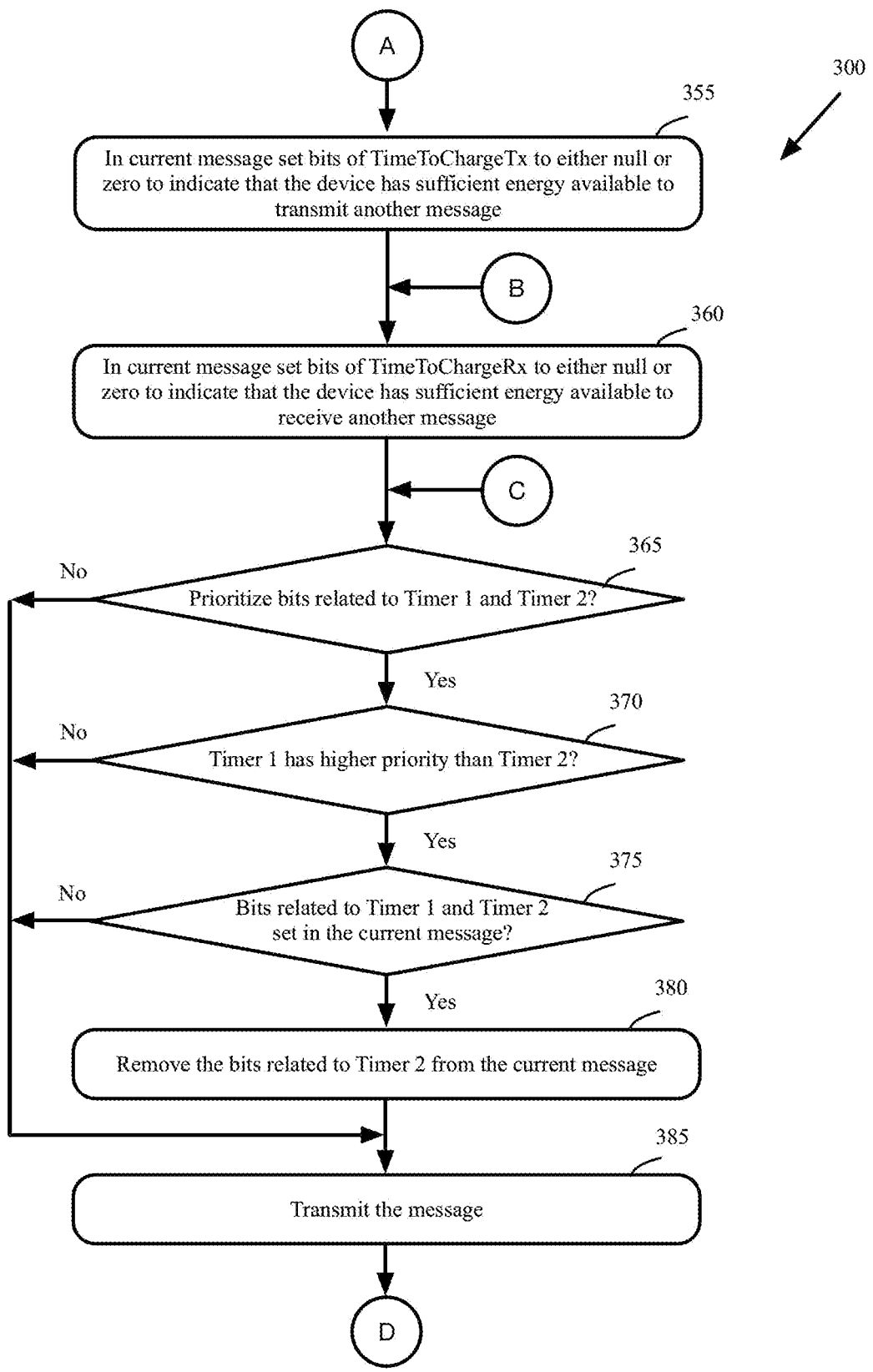

FIGS. 3A-3B illustrate a flowchart of an example method/process 300 performed by an AIoT device to indicate the time required by the AIoT device to recharge to receive or transmit a subsequent message, according to an example implementation of the present disclosure. With reference to FIG. 3, the process 300 may be performed by at least one processor of any of the AIoT wireless terminals 101-104, shown in FIG. 1.

At block 305, the amount of energy stored in the energy storage device (e.g., the capacitor) of the AIoT device may be measured. A determination may be made (at block 310) as to whether the measured energy is greater than the second threshold. If the determination is negative, the process 300 may return to block 305, which was described above.

Otherwise, a determination may be made (at block 315) as to whether the AIoT device is required to transmit a message. For example, the AIoT device may have received a message from the BS and may have a response message to transmit to the BS. As another example, the AIoT device may have an AIoT device-initiated message, such as user data or its status to transmit to the BS.

When the AIoT device is not required to transmit a message, the process 300 may return to block 305, which was described above. Otherwise, the process may set (at block 320) the adjusted measured energy, as the amount of energy stored in the energy storage device of the AIoT device minus the second threshold. For example, the adjusted measured energy may reflect the reduction in the available energy that is to be used by the device to transmit the current complete data object at a certain transmit power.

Next, a determination may be made (at block 325) as to whether the adjusted measured energy is greater than the sum of the first and second thresholds. If the determination is positive, the process 300 may proceed to block 355, which is described below. Otherwise, the process 300 may set (at block 330) Timer 2 to the time required to recharge the energy storage of the AIoT device from the adjusted measured energy to a level that is greater than the second threshold. For example, the AIoT device may estimate a period of time that is required for the device to recharge the device's energy storage to a level that is sufficient to facilitate the operation of the device's transmitter and other internal circuitry related to the transmitter's operation. The process 300 may set Timer 2 to the estimated amount of time after which the AIoT device may have harvested enough energy to be able to receive a message and transmit a subsequent message.

The process 300 may set (at block 335) the bits of TimeToChargeTx in the current message to indicate a first shared value that is at least equal to Timer 2. Since the number of bits required to implement Timer 2 may be large (e.g., 16 bits, 32 bits, etc.), transmitting several a large number of bits by the AIoT to the BS may be a waste of energy. Instead, some embodiments may transmit fewer bits (referred to herein as TimeToChargeTx) to indicate a set of enumerated values.

The AIoT device may use N logical bits (N being a positive integer) for TimeToChargeTx to encode a value X that represents an estimation of the time period, following the transmission of the current data object, that the AIoT device does not have sufficient energy resources to receive a subsequent message (e.g., X may represent a mapping of the number of seconds as estimated by the device before it may have sufficient energy resources to receive a message). The value X may be a member of a set of values. The values of the set that X may represent may be known by the AIoT device and by the BS. The number of different values of the set may be represented by $2^N$, where each unique bit combination of the 2 bits may define a unique value that X may take from the set of values.

As a non-limiting example, TimeToChargeTx bits may be 4 bits representing 16 enumerated values. The enumerated values for the TimeToChargeTx bits may be configured to the AIoT device, at the manufacturing time or through RRC (re) configuration, to represent a set of values (e.g., 0, 5, 10, 15, 25, 50, etc.). When Timer 2 value is 18.5, the enumerated value that is greater or equal to 18.5 (in this example, the enumerated value 25) may be selected and the TimeToChargeTx bits may be set to 0101 to indicate Timer 2 is less than or equal to the fifth enumerated value.

A determination may be made (at block 340) as the whether the adjusted measured energy is greater than the first threshold. If the determination is negative, the process 300 may proceed to block 360, which is described below. Otherwise, the process 300 may set (at block 345) Timer 1 to the time required to recharge the energy storage of the AIoT device from the adjusted measured energy to a level that is greater than the first threshold. The AIoT device may estimate a period of time that is required to recharge the device's energy storage device to a level that is sufficient to facilitate the operation of the device's receiver and other internal circuitry related to the receiver operation. The process 300 may set (at block 350) the bits of TimeToChargeRx in the current message to indicate a first shared value that is at least equal to Timer 1.

The AIoT device may provide, as part of the transmission of the current message, an indication that following the transmission of the current message, the AIoT device does or does not have sufficient energy resources to facilitate the operation of the device's receiver and other internal circuitry related to the receiver's operation to receive a subsequent message. The AIoT device may use M logical bits to encode a value Y that represents the estimated time period following the transmission of the current data object that the AIoT device does not have sufficient energy resources to transmit subsequent a data object (i.e., Y may represent a mapping of the number of seconds as estimated by the device before it may have sufficient energy resources to transmit a message). The value Y may be a member of a set of values. The values of the set that Y may take may be known by the AIoT device and by the BS. The number of different values of the set may be represented by 2. Each unique bit combination of the $2^M$ bits may define a unique value that Y may take from the set of values.

Similar to what was described above for the TimeToChargeTx bits, the TimeToChargeRx bits may be used to indicate a set of enumerated values (which may be different than the set of enumerated values for the TimeToChargeTx bits). The enumerated values for the TimeToChargeRx bits may be configured to the AIoT device, at the manufacturing time or through RRC (re) configuration, to represent a set of values (e.g., 0, 2, 5, 7, 10, etc.). The value of the TimeToChargeRx bits may be set to the enumerated value that is at least equal to the Timer 1. The process 300 may then proceed to block 365, which is described below.

At block 355, the process 300 may set the bits of TimeToChargeTx in the current message to either null or zero to indicate that the device has sufficient energy available to transmit a subsequent message. The AIoT device may select one of the values Y from the set of values (e.g., the value of 0) to indicate that in zero seconds subsequent to the transmission of the current message, the AIoT device may have sufficient energy resources to transmit a subsequent message (e.g., the value 0 may indicate that the device currently has sufficient energy resources to transmit a subsequent message). Alternatively, the device may transmit no logical bits related to the time required by the device to recover sufficient energy resources to transmit a subsequent message in the current data object to indicate the device currently has sufficient energy resources to transmit a subsequent message.

The process 300 may set (at block 360) the bits of TimeToChargeRx in the current message to either null or zero to indicate that the device has sufficient energy available to receive a subsequent message. The AIoT device may provide, as part of the transmission of the current message, an indication that following the transmission of the current message, the AIoT device does or does not have sufficient energy resources to facilitate the operation of the device's transmitter and other internal circuitry related to the transmitter's operation to transmit a subsequent message.

The AIoT device may select one of the values X from the set of values (e.g., the value of 0) to indicates that in zero seconds subsequent to the transmission of the current message, the AIoT device may have sufficient energy resources to receive a subsequent message (e.g., the value 0 may indicate that the device currently has sufficient energy resources to receive a subsequent message). Alternatively, the device may transmit no logical bits related to the time required by the device to recover sufficient energy resources to receive a subsequent message in the current data object to indicate the device currently has sufficient energy resources to receive a subsequent message.

At block 365, a determination may be made whether to prioritize the bits related to Timer 1 and Timer 2. The AIoT device, in some embodiments, may prioritize the transmission of the N logical bits of TimeToChargeRx over the transmission of the M logical bits of TimeToChargeTx such that if both the N logical bits and the M logical bits may be available to be transported in the same message and a prioritization is required such that only one of the logical bit sets are to be transported, then the N logical bits may be transported by the message and the M logical bits may not be transported by the message.

When a message is ready to be transmitted, the lower network layers may have to choose between two operations that may sometimes collide. For example, two operations may collide for a transmission resource such as some resource blocks in a slot. In that case, the lower priority operation may not be performed. The non-zero values of the TimeToChargeRx bits and the TimeToChargeTx bits may always be included in the data structure for the message by the upper network layers. The lower network layers may be preconfigured to either do prioritization or not. When prioritization is required, the bits related to the lower priority Timer 2 may be removed from the current message.

If the bits related to Timer 1 and Timer 2 are not to be prioritized, the process 300 may proceed to block 385, which is described below. Otherwise, a determination may be made (at block 370) as to whether Timer 1 has higher priority than Timer 2. If the determination is negative, the process 300 may proceed to block 385, which is described below. Otherwise, a determination may be made (at block 375) as to whether the bits related to Timer 1 and Timer 2 are set in the current message. If the determination is negative, the process 300 may proceed to block 385, which is described below. Otherwise, the bits related to Timer 2 (e.g., the TimeToChargeTx bits) may be removed from the current message.

At block 385, the process 300 may transmit the message. The process 300 may then return back to block 305, which was described above.

It should be noted that for a 3GPP compliant device, such as a UE, IoT, or AIoT, it is generally understood that the operation of the receiver circuitry and other supporting internal circuitry related to the receiver operation sufficient power to receive a complete message may require less energy than the operation of transmitter circuitry and other supporting internal circuitry related to the transmitter operation required to transmit a complete message. Therefore, this disclosure treats any threshold related to the power required to receive a complete single message as less than any threshold related to the power required to transmit a complete single message (e.g., the first threshold described above is less than second threshold).

Figure 4:
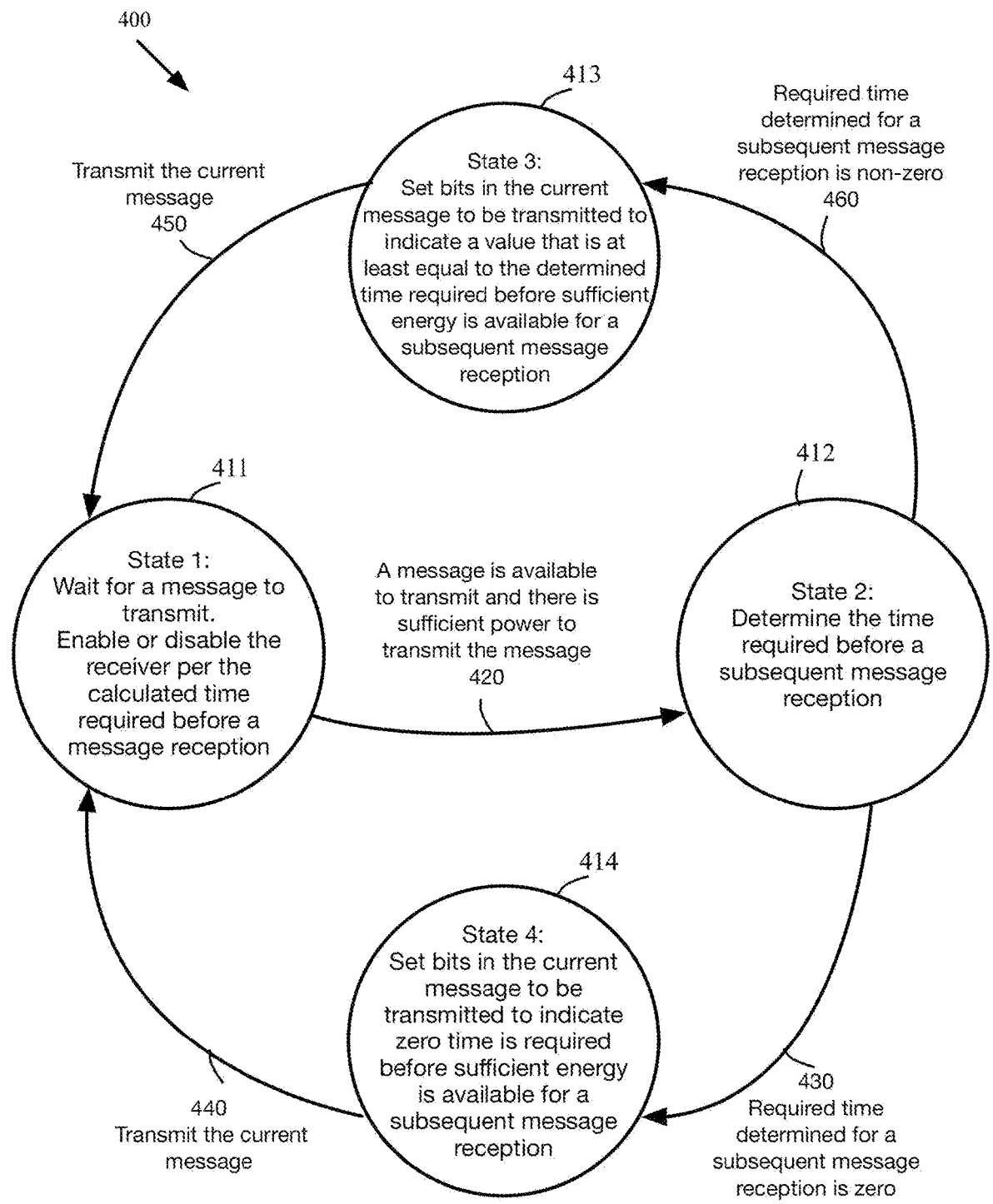
FIG. 4 is a state diagram of an AIoT device for setting a value indicating the time before sufficient energy is available for receiving a message after the transmission of the current message, according to an example implementation of the present disclosure.

FIG. 4 is a state diagram 400 of an AIoT device for setting a value indicating the time before sufficient energy is available for receiving a message after the transmission of the current message, according to an example implementation of the present disclosure. As shown, in the first state 411, the AIoT device may be waiting for a message to transmit. The AIoT device may enable or disable its receiver per the calculated time required before a message reception.

The AIoT device may transition (as shown by the arrow 420) from the first state 411 to the second state 412 when a message is available to transmit. The AIoT device may transition from the first state 411 to the second state 412 when there is enough power to transmit the current message.

In the second state 412, the AIoT may determine the time required before a subsequent message reception. When the required time determined for a subsequent message reception is non-zero, the AIoT device may transition from the second state 412 to the third state 413 as shown by the arrow 460.

When the AIoT device consumes energy stored in the device's energy storage capacitor (e.g., by an operation of the device's transmitter, by an operation of the device's receiver, or other device operation that consumes energy), the energy stored in the AIoT device's energy storage capacitor may fall to a level that is below a first threshold such that the AIoT device cannot provide its receiver circuitry and other supporting internal circuitry related to the receiver operation sufficient power to receive a complete message. Therefor the device may transition from the second operational state 412 to the third operational state 413.

In the third operational state 413, the AIoT device may set bits in the current message to be transmitted to indicate a value that is at least equal to the determined time required before sufficient energy is available for a subsequent message reception. Since the AIoT device in the third state 413 has enough power to transmit the current message, the AIoT device may transmit the current message and may transition to the first state 411 (as shown by the arrow 450).

Since the AIoT device has transitioned from the third state 413 into the first state 411, the AIoT device may disable it receiver in the first state 411. The disabling of the device's receiver in the first operational state 411 is a mechanism of the device to prevent the unnecessary loss of power that may result from attempting to operate the receiver (e.g., due to a paging of the device by the BS) before there is sufficient power for the complete and successful reception of a message. The AIoT device may enable the receiver in the first state 411 when sufficient energy is stored in the energy storage of the AIoT device to receive a subsequent message.

In the second state 412, when the required time determined for a subsequent message reception is zero, the AIoT device may transition from the second state 412 to the fourth state 414 as shown by the arrow 430. In the fourth state 412, the bits in the current message to be transmitted may be set to indicate zero time is required before sufficient energy is available for a subsequent message reception. Alternatively, the bits may not be included in the current message (e.g., indicating a null value).

The AIoT device may transmit the current message and may transition from the fourth state 414 to the first state 411, as shown by the arrow 440. Since the AIoT device has transitioned from the fourth state 414 into the first state 411, the AIoT device may keep the receiver enabled. Enabling the receiver is a mechanism for allowing the device to use the power stored in the device's energy storage to communicate with a BS as there is sufficient power for the complete and successful reception of a message.

Figure 5:
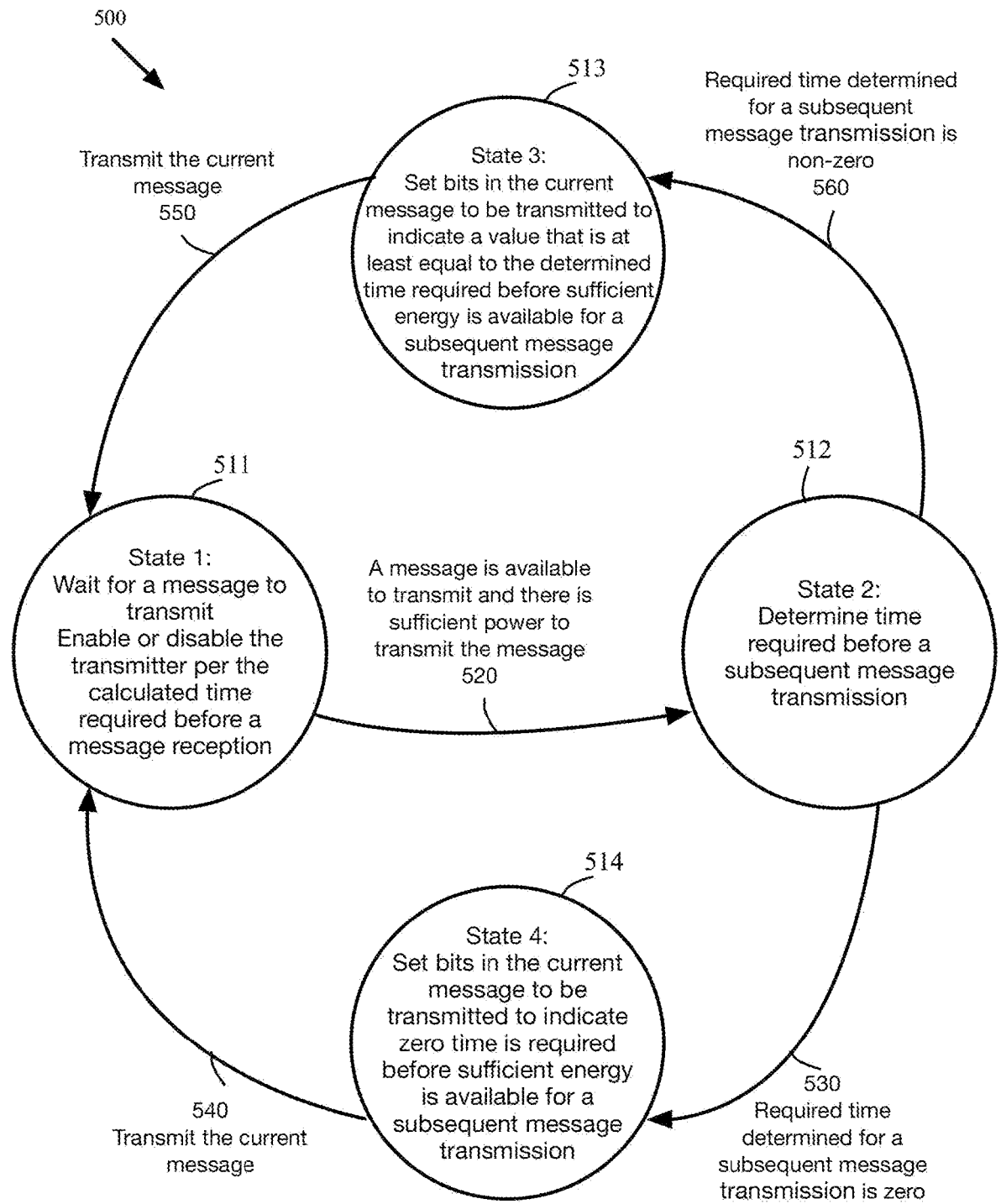
FIG. 5 is a state diagram of an AIoT device for setting a value indicating the time before sufficient energy is available for transmitting a message after the transmission of the current message, according to an example implementation of the present disclosure.

FIG. 5 is a state diagram 500 of an AIoT device for setting a value indicating the time before sufficient energy is available for transmitting a message after the transmission of the current message, according to an example implementation of the present disclosure. As shown, in the first state 511, the AIoT device may be waiting for a message to transmit. The AIoT device may enable or disable the receiver per the calculated time required before a message transmission.

The AIoT device may transition (as shown by the arrow 520) from the first state 511 to the second state 512 when a message is available to transmit. The AIoT device may transition from the first state 511 to the second state 512 when there is enough power to transmit the current message.

In the second state 512, the AIoT may determine the time required before a subsequent message transmission. When the required time determined for a subsequent message transmission is non-zero, the AIoT device may transition from the second state 512 to the third state 513 as shown by the arrow 560.

When the AIoT device consumes energy stored in the device's energy storage capacitor (e.g., by an operation of the device's transmitter, by an operation of the device's receiver, or other device operation that consumes energy), the energy stored in the AIoT device's energy storage capacitor may fall to a level that is below a second threshold such that the AIoT device cannot provide its transmitter circuitry and other supporting internal circuitry related to the transmitter operation sufficient power to transmit a complete message after the transmission of the current message. Therefore, the device may transition from the second operational state 512 to the third operational state 513.

In the third operational state 513, the AIoT device may set bits in the current message to be transmitted to indicate a value that is at least equal to the determined time required before sufficient energy is available for a subsequent message transmission. Since the AIoT device in the third state 513 has enough power to transmit the current message, the AIoT device may transmit the current message and may transition back to the first state 511 (as shown by the arrow 550).

Since the AIoT device has transitioned from the third state 513 into the first state 511, the AIoT device may disable it transmitter in the state 511. The disabling of the device's transmitter in the first operational state 511 is a mechanism of the device to prevent the unnecessary loss of power that may result from attempting to operate the transmitter (e.g., due to receiving a request message from the BS) before there is sufficient power for the complete and successful transmitter of a message. The AIoT device may enable the transmitter in the first state 511 when sufficient energy is stored in the energy storage device of the AIoT device to transmit a subsequent message.

In the second state 512, when the required time determined for a subsequent message transmission is zero, the AIoT device may transition from the second state 512 to the fourth state 514 as shown by the arrow 530. In the fourth state 512, the bits in the current message to be transmitted may be set to indicate zero time is required before sufficient energy is available for a subsequent message transmission. Alternatively, the bits may not be included in the current message (e.g., indicating a null value).

The AIoT device may transmit the current message and may transition from the fourth state 514 to the first state 511, as shown by the arrow 540. Since the AIoT device has transitioned from the fourth state 514 into the first state 511, the AIoT device may keep the transmitter enabled. Enabling the transmitter is a mechanism for allowing the device to use the power stored in the device's energy storage to communicate with a BS as there is sufficient power for the complete and successful transmission of a message.

As noted above, the time between any two energy harvesting opportunities may be non-determinist. However, the AIoT device may include a process to track over some period of time how many energy harvesting opportunities have occurred. The AIoT device may include circuitry (e.g., Coulomb counter circuitry) to determine the amount of energy that each harvesting opportunity may have provided. With the collection of such information regarding the occurrence of energy harvesting opportunities and the amount of energy that is harvested at each opportunity and stored into the device's energy storage capacitor, the device may derive an estimation of the time may take to recharge the energy storage capacitor from its current energy storage level to an energy storage level that may exceed a first threshold and thus be capable of operating the device's receiver only, or exceed a second threshold and thus be capable of operating the device's transmitter only. It should be noted that by combining the time to recharge the capacitor to the level exceeding the first threshold so as to operate the receiver only and the time to recharge the capacitor to the second threshold so as to operate the transmitter only, the resulting value may be used to estimate the time that may take to recharge the energy storage capacitor from its current energy storage level to an energy storage level that may be enable the operation of both the transmitter and receiver.

The estimation of the time that may take to recharge the capacitor from its current energy storage level to an energy storage level that may exceed the first threshold and the second threshold may be sent to the BS so that the BS may optimize its scheduling of messages to the AIoT device in order not to conflict with the device's receiver and transmitter status. For example, the BS may not transmit a message to the device when the device's receiver is disabled. The BS may not transmit a message to the device that may trigger an immediate expected response when the device's receiver is enabled but the transmitter is disabled. The time to the first threshold may be known to the BS as TimeToRecharge_RX (or Timer 1), and the time to the second threshold may be known to the BS as TimeToRecharge_TX (or Timer 2).

The TimeToRecharge_TX and the TimeToRecharge_RX may be transported by the UEAssistanceInformation element as defined below. Alternatively, they may be transported on other transport mechanisms such as MAC Control Element (MAC_CE), Random Access Preamble, Layer 3, Layer 2, Physical layer such as Uplink Control Information (UCI), scrambling ID, Radio Network Temporary Identifier (RNTI), etc. The estimated time to recharge for reception or transmission may be generalized to include information related to the device's predicted available energy states.

Figure 6:
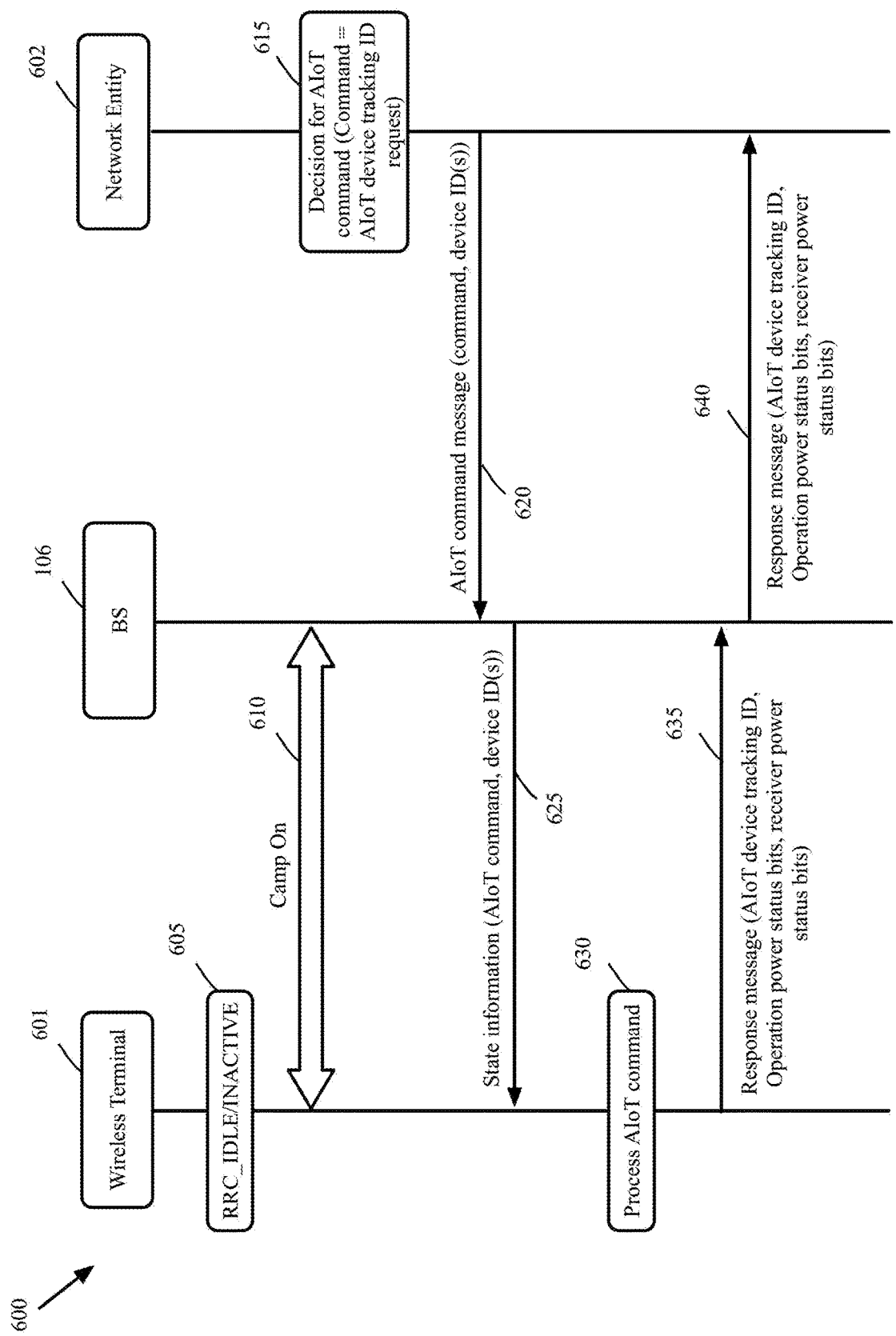
FIG. 6 is a sequence diagram illustrating an example message flow for a wireless terminal, such as an AIoT device, to transmit an indication of the amount of time required for the AIoT device to harvest sufficient energy for subsequent reception and transmission of messages, according to an example implementation of the present disclosure.

FIG. 6 is a sequence diagram 600 illustrating an example message flow for a wireless terminal, such as an AIoT device, to transmit an indication of the amount of time required for the AIoT device to harvest sufficient energy for subsequent reception and transmission of messages, according to an example implementation of the present disclosure. With reference to FIG. 6, the commands, also referred to as configuration change commands, may impact the "certain transmitter power level" parameter, described above. The commands may be transmitted by a BS (e.g., a gNB) or other authorized transmission device (e.g., the UE 105, shown in FIG. 1) in one or more of multiple signaling methods. Such multiple signaling methods may include system information broadcast and dedicated signaling.

With further reference to FIG. 6, the wireless terminal 601 may be one of the energy harvesting wireless terminals 102-104, shown in FIG. 1. In the example of FIG. 6, a network entity 602 may decide to send an AIoT command to the wireless terminal 601.

In one configuration, the network entity 602 may be a network node such as a server or a node in a core network, such as an Access and Mobility Management Function (AMF). In another configuration, the network entity 602 may be a server resident in a private/public network. The BS 106 may be similar to the BS 106, shown in FIG. 1. The BS 106, in some implementation, may be a gNB.

At block 605, the wireless terminal 601 may be in RRC_IDLE or RRC_INACTIVE state. As shown in step 610, the wireless terminal 601 may be camping on a cell served by the BS 106. At block 615, the network entity may decide to instruct a configuration change to the AIoT device 601. For example, the network entity may decide to change the configuration of the wireless terminal 601, such as changing the configuration of the "certain transmitter power level."

In step 620, the network entity 602 may send the configuration change message that may include one or more commands, such as (e.g., set a new "certain transmitter power level"), each of which may be associated with one or more device IDs, including the ID of the AIoT device 601. Additionally, or alternatively, the configuration change message may include one or more device group IDs, each of the device group ID may identify a group of devices.

In step 625, the BS 106 may broadcast the contents of the configuration change message in system information, such as one or more System Information Blocks (SIBs). In block 630, the AIoT device 601 may receive the system information broadcast and may process the command. For example, the AIoT device 601 may check if the device ID of the wireless terminal 601 is included. If so, the AIoT device 601 may execute the command to change the configuration as instructed by the received command.

In step 635, the AIoT device 601 may send a message (also referred to as a data object) to the BS 106 that may include the AIoT device's tracking ID. The response message may include the TimeToChargeTx bits and/or the TimeToChargeRx bits described above. In step 640, the BS 106 may forward the content of the data object message to the network entity 602.

Figure 7:
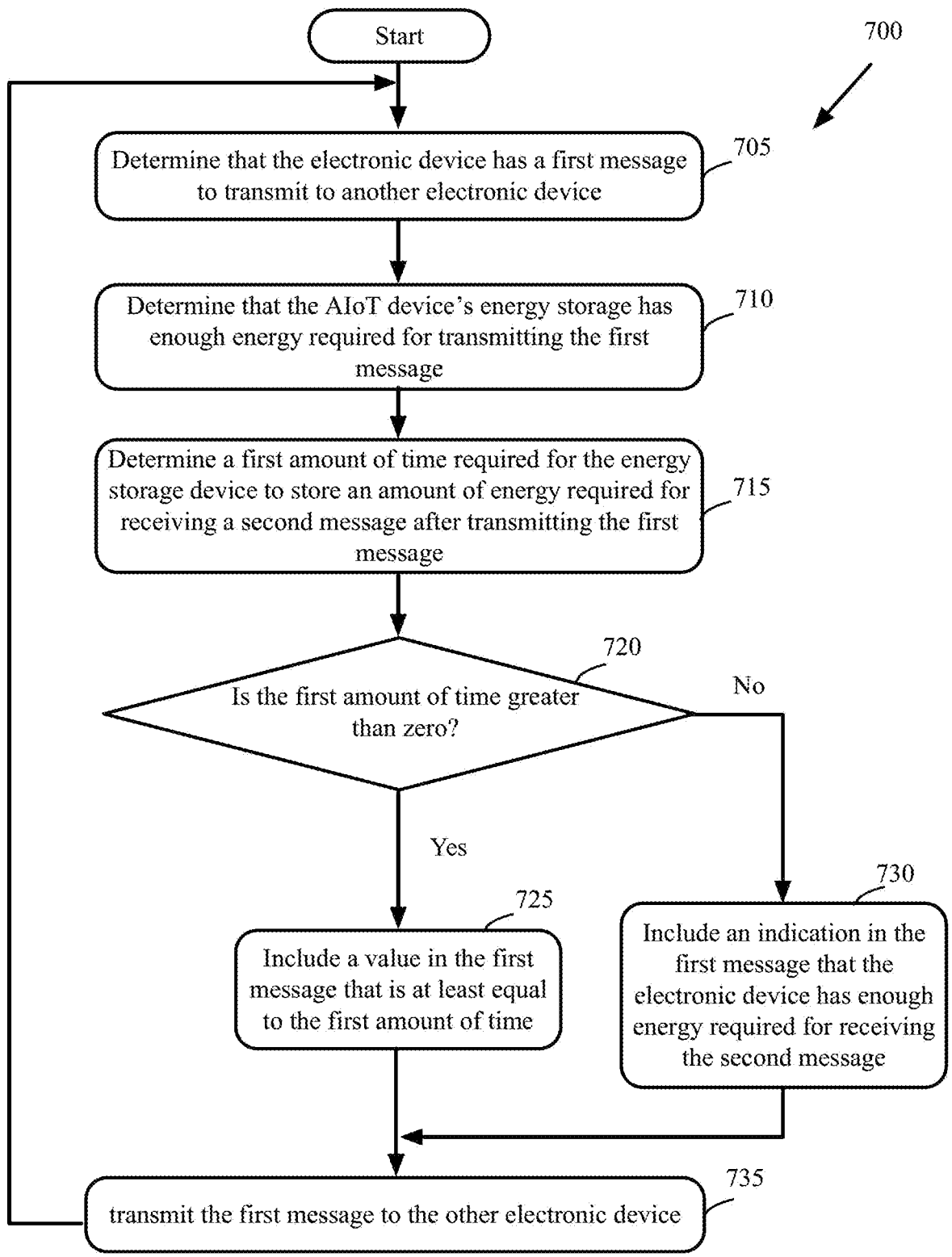
FIG. 7 is a flowchart illustrating an example method/process performed by a wireless terminal implementing the embodiments of FIGS. 3-6, according to an example implementation of the present disclosure.

FIG. 7 is a flowchart illustrating an example method/process 700 performed by a wireless terminal implementing the embodiments of FIGS. 3-6, according to an example implementation of the present disclosure. With reference to FIG. 7, the process 700 may be performed by at least one processor of any of the AIoT wireless terminals 101-104, shown in FIG. 1. The AIoT wireless terminal may include an energy harvesting component and an energy storage capacitor, as described below with reference to FIG. 12.

At block 705, the process 700 may determine that the electronic device has a first message to transmit to another electronic device. For example, the electronic device may have received a request message from the BS and may have a response message to transmit. As another example, the electronic device may have to transmit a message to the network on the AIoT device's initiation. For example, the AIoT device may need to access the network for the purposes of sending the device status data (e.g., data representing the AIoT device's operation). The AIoT device may need to send the device user data (e.g., data representing the operation of sensors on the device). The AIoT device may need to acquire the device's operational data (e.g., device configuration data) from the network. The AIoT device may need to acquire the device's user data (e.g., sensor configuration data) from the network. In such scenarios, the AIoT device may initiate the communication with the network without receiving a request message or a command from the network.

At block 710, the process 700 may determine that the AIoT device's energy storage has enough energy required for transmitting the first message. As a nonlimiting example, some embodiments may use a Coulomb counter for measuring the amount of energy stored in the power storage device of the AIoT device. The Coulomb counter may operate by measuring the current flow in a circuit, either continuously or at discrete intervals, and integrating it over time. This integration process may calculate the total charge (in Coulombs) that has passed through the circuit. The Coulomb counter may include a circuitry that outputs one or more bits that the processor of the AIoT device may read to determine the level of charge held by the capacitor. The AIoT device may then compare the stored energy with the second threshold, described above, and may determine that the stored energy is greater than the second threshold.

The process 700 may determine (at block 715) that a first amount of time required for the energy storage device to store an amount of energy that is sufficient for receiving a second message after transmitting the first message. For example, the AIoT device may determine the amount of stored energy that may be left after transmitting the current message as the current amount of stored energy minus the second threshold value (e.g., as described above for setting the adjusted measured energy in block 320 of FIG. 3). The AIoT device may then determine the first amount of time required for the energy storage device to store an amount of energy required for receiving a second message after transmitting the first message based on the the amount of stored energy that may be left after transmitting the first message.

A determination may be made (at block 720) as to whether the first amount of time is greater than zero. In a case that the first amount of time is greater than zero, a value may be included (at block 725) in the first message that is at least equal to the first amount of time. In some implementation, the AIoT device may disable the receiver circuitry for at least the first amount of time in the case that the first amount of time is greater than zero. In some implementations, including the value in the first message that is at least equal to the first amount of time may include selecting an enumerated value, from several enumerated values, that is at least equal to the first amount of time, and setting several bits in the first message to indicate the selected enumerated time value, as described above with reference to FIG. 3.

In case that the first amount of time is not greater than zero (i.e., the first amount of time is zero), an indication may be included (at block 730) in the first message that the electronic device has enough energy required for receiving the second message. In some implementations, including the indication in the first message that the electronic device has enough energy required for receiving the second message may include not inserting any bits in the first message to indicate a selected enumerated time value (e.g., indicating a null value). In other implementations, including the indication in the first message that the electronic device has enough energy required for receiving the second message may include selecting an enumerated timer value, from several enumerated time values, that indicates a zero amount of time and setting several bits in the first message to identify the selected enumerated value.

In some implementations, the enumerated time values may be configured to the electronic device at a the time of manufacturing the electronic device. In some implementations, the AIoT device may receive an RRC (re) configuration message that includes updated values for the enumerated time values.

At block 735, the first message may be transmitted to the other device. The process 700 may then proceed to block 705, which was described above.

In some implementations, the electronic device may determine a second amount of time required for the energy storage device to store an amount of energy that is sufficient for transmitting a third message after receiving the second message. In a case that the second amount of time is greater than zero, the AIoT may include a value that is at least equal to the second amount of time in the first message. The AIoT device may also disable its transmitter. In a case that the second amount of time is zero, the AIoT may include an indication in the first message that the electronic device has enough energy required for transmitting the third message after receiving the second message.

In some implementations, including the value that is at least equal to the second amount of time in the first message may include selecting, from several enumerated time values, an enumerated time value that is at least equal to the second amount of time, and setting several bits in the first message to indicate the selected enumerated time value.

In some implementations, including the indication in the first message that the electronic device has enough energy required for transmitting the third message after receiving the second message may include not inserting any bits in the first message (e.g., indicating a null value). In some implementations, including the indication in the first message that the electronic device has enough energy required for transmitting the third message after receiving the second message includes selecting an enumerated time value, from several enumerated time values, that indicates a zero amount of time and setting the several bits in the first message to indicate the selected enumerated time value.

UE Assistance Information Element

The UEAssistanceInformation message that is used for the indication of UE assistance information to the network is described below in Tables 1 and 2. The signalling radio bearer are signalling radio bearer 1 (SRB1) and signalling radio bearer 3 (SRB3). The radio link control service access point (RLC-SAP) is acknowledge mode (AM). The logical channel is Downlink Control Channel (DCCH). The direction of the message is from the wireless terminal (e.g., the AIoT device 601 of FIG. 6) to the network (e.g., to the BS 106 and/or the network entity 602 of FIG. 6).

TABLE 1

UEAssistanceInformation message

-- ASN1START
-- TAG-UEASSISTANCEINFORMATION-START

TABLE 1-continued

UEAssistanceInformation message

```
UEAssistanceInformation ::=          SEQUENCE {
    criticalExtensions               CHOICE {
        ueAssistanceInformation          UEAssistanceInformation-IEs,
        criticalExtensionsFuture         SEQUENCE { }
    }
}
UEAssistanceInformation-IEs ::=      SEQUENCE {
    delayBudgetReport                DelayBudgetReport                         OPTIONAL,
    lateNonCriticalExtension         OCTET STRING                              OPTIONAL,
    nonCriticalExtension             UEAssistanceInformation-v1540-IEs                   OPTIONAL
}
UEAssistanceInformation-v1540-IEs ::=   SEQUENCE {
    overheatingAssistance            OverheatingAssistance                     OPTIONAL,
    nonCriticalExtension             UEAssistanceInformation-v1610-IEs                   OPTIONAL
}
UEAssistanceInformation-v1610-IEs ::=   SEQUENCE {
    idc-Assistance-r16               IDC-Assistance-r16                        OPTIONAL,
    drx-Preference-r16               DRX-Preference-r16                        OPTIONAL,
    maxBW-Preference-r16                 MaxBW-Preference-r16                       OPTIONAL,
    maxCC-Preference-r16                 MaxCC-Preference-r16                       OPTIONAL,
    maxMIMO-LayerPreference-r16              MaxMIMO-LayerPreference-r16                    OPTIONAL,
    minSchedulingOffsetPreference-r16        MinSchedulingOffsetPreference-r16              OPTIONAL,
    releasePreference-r16            ReleasePreference-r16                     OPTIONAL,
    sl-UE-AssistanceInformationNR-r16        SL-UE-AssistanceInformationNR-r16              OPTIONAL,
    referenceTimeInfoPreference-r16  BOOLEAN                                   OPTIONAL,
    nonCriticalExtension             UEAssistanceInformation-v1700-IEs                   OPTIONAL
}
UEAssistanceInformation-v1700-IEs ::=       SEQUENCE {
    ul-GapFR2-Preference-r17             UL-GapFR2-Preference-r17                   OPTIONAL,
    musim-Assistance-r17             MUSIM-Assistance-r17                      OPTIONAL,
    overheatingAssistance-r17        OverheatingAssistance-r17                 OPTIONAL,
    maxBW-PreferenceFR2-2-r17            MaxBW-PreferenceFR2-2-r17                  OPTIONAL,
    maxMIMO-LayerPreferenceFR2-2-r17         MaxMIMO-LayerPreferenceFR2-2-r17               OPTIONAL,
    minSchedulingOffsetPreferenceExt-r17     MinSchedulingOffsetPreferenceExt-r17           OPTIONAL,
    rlm-MeasRelaxationState-r17      BOOLEAN                                   OPTIONAL,
    bfd-MeasRelaxationState-r17      BIT STRING (SIZE (1..maxNrofServingCells))          OPTIONAL,
    nonSDT-DataIndication-r17        SEQUENCE {
        resumeCause-r17              ResumeCause                               OPTIONAL
    }                                                                          OPTIONAL,
    scg-DeactivationPreference-r17       ENUMERATED { scgDeactivationPreferred,
noPreference }
OPTIONAL,
    uplinkData-r17                   ENUMERATED { true }                       OPTIONAL,
    rrm-MeasRelaxationFulfilment-r17     BOOLEAN                                   OPTIONAL,
    propagationDelayDifference-r17       PropagationDelayDifference-r17                OPTIONAL,
    nonCriticalExtension             UEAssistanceInformation-v1800-IEs                   OPTIONAL
}
UEAssistanceInformation-v1800-IEs ::=       SEQUENCE {
    TimeToRecharge_RX                INTEGER (1..maxRxInterval),
    TimeToRecharge_TX                INTEGER (1..maxTxInterval),
    nonCriticalExtension             SEQUENCE { }                              OPTIONAL
}
///Note other elements of this IE are removed for brevity //////
-- TAG-UEASSISTANCEINFORMATION-STOP
-- ASN1STOP
```

TABLE 2

UEAssistanceInformation field descriptions

TimeToRecharge_RX
Indicates time until the device has sufficient energy in its energy storage device to receive a message (e.g., 00s, 01s, 03s . . . NNs)
TimeToRecharge_TX
Indicates time until the device has sufficient energy in its energy storage device to transmit a message (e.g., 00s, 05s, 10s . . . YYs)

Figure 8A:
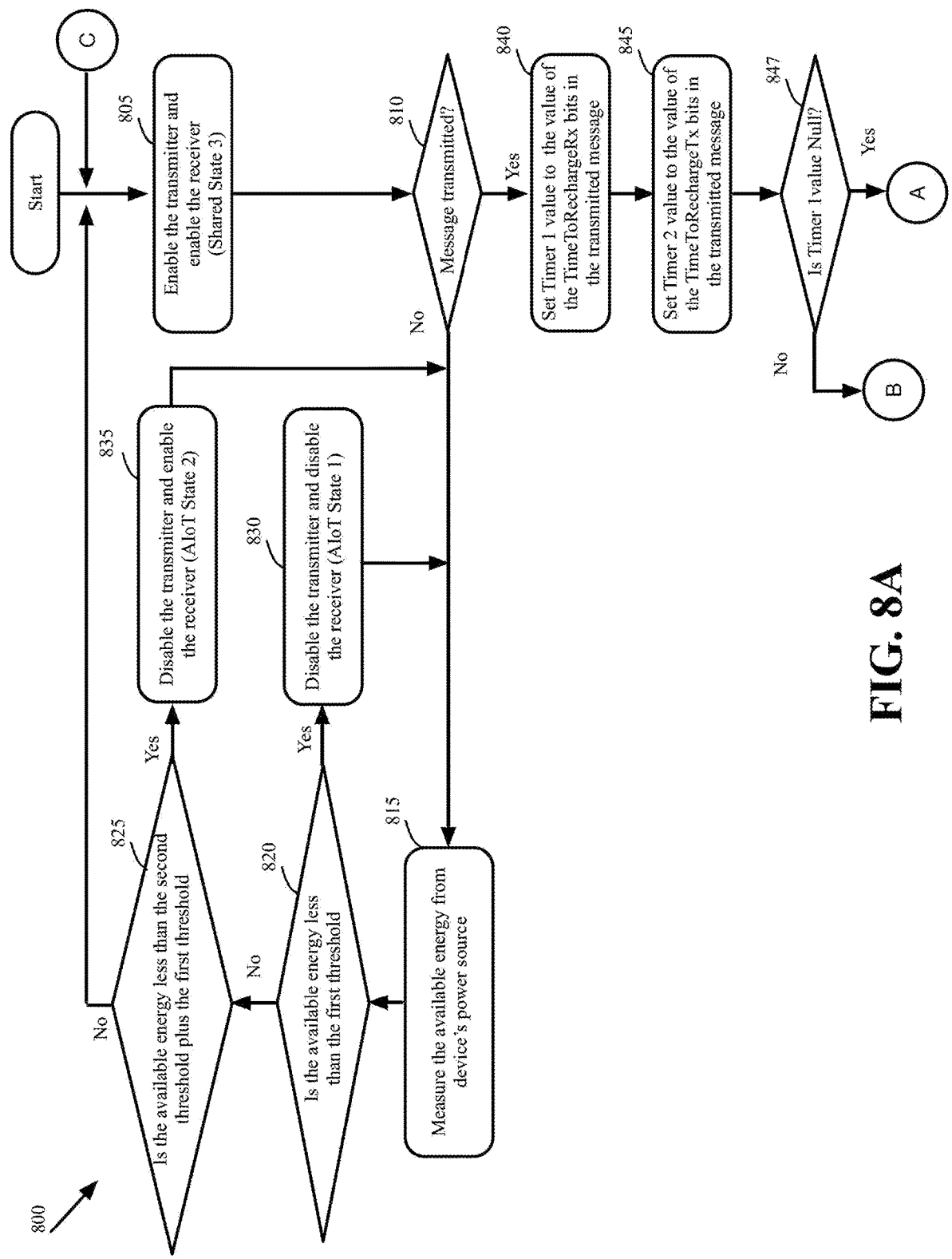
FIGS. 8A-8C are a flowchart illustrating an example method/process performed by a wireless terminal to manage receiver and transmitter states of the wireless terminal shared with a BS, according to an example implementation of the present disclosure.
Figure 8B:
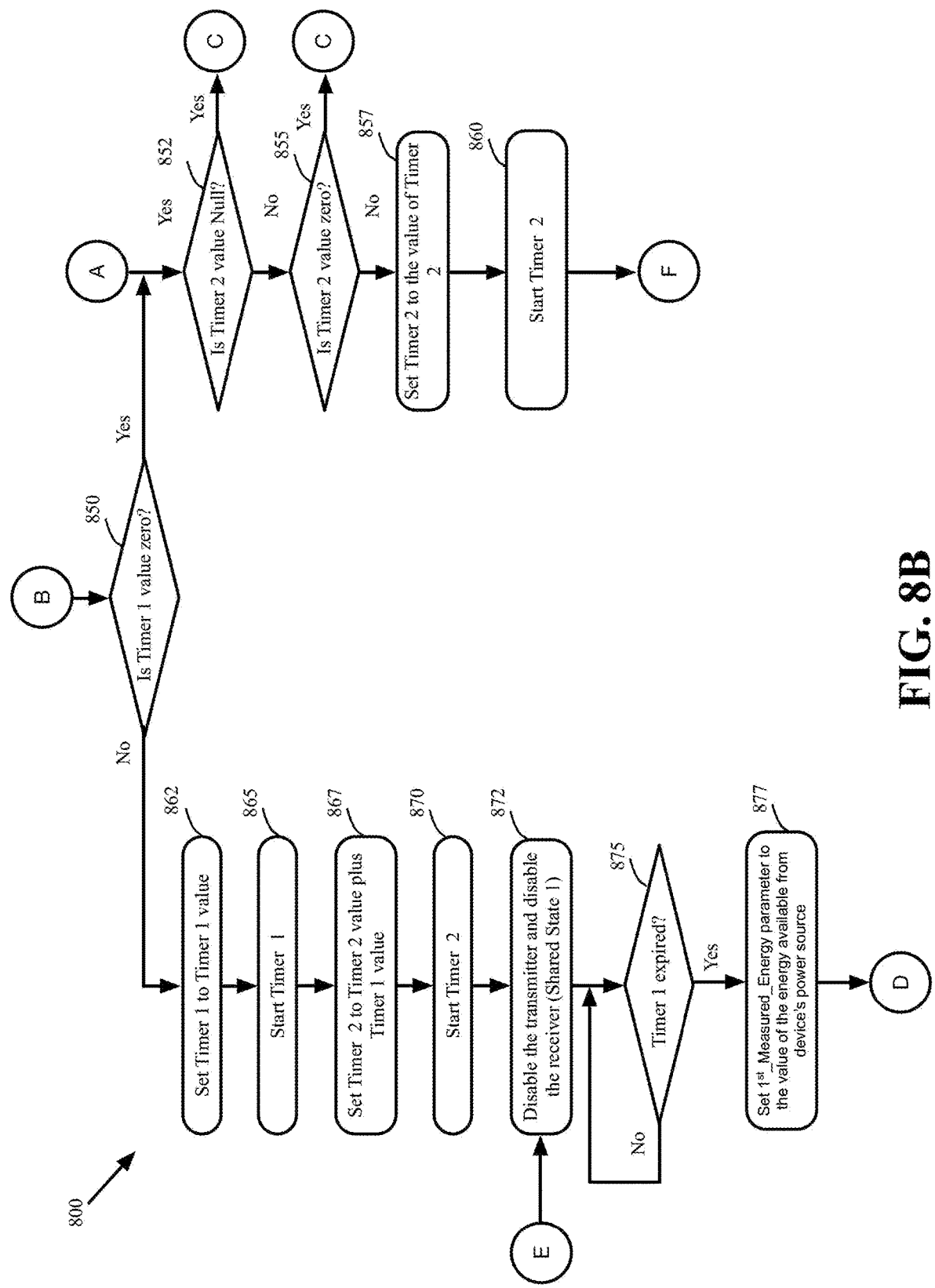
Figure 8C:
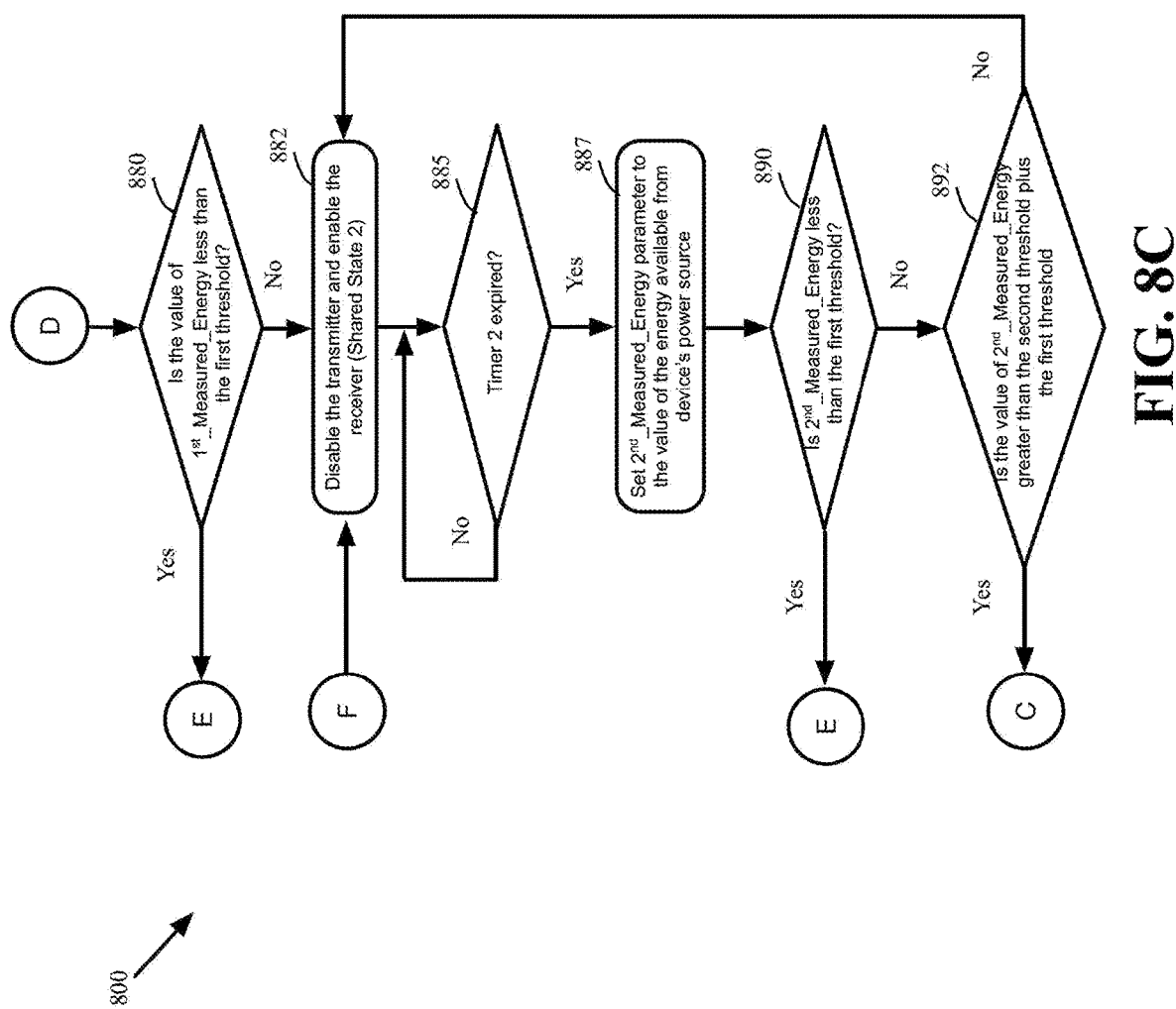

Managing the Shared Receiver and Transmitter States of a Wireless Terminal with the Bs FIGS. 8A-8C are a flowchart illustrating an example method/process 800 performed by a wireless terminal to manage receiver and transmitter states of the wireless terminal shared with a BS, according to an example implementation of the present disclosure. With reference to FIGS. 8A-8C, the process 800 may be performed by at least one processor of any of the AIoT wireless terminals 101-104, shown in FIG. 1.

At block 805, the process 800 may enable the transmitter and the receiver of the AIoT device. At block 810, a determination may be made as to whether a message is transmitted by the AIoT device. If the determination is positive, the process 800 may transfer to the block 840, which is described below. Otherwise, the process 800 may measure (at block 815) the energy available from the device's power source. For example, the processor of the AIoT device may read the value of one or more bits from a Coulomb counter of the AIoT device to determine the power level of the energy storage capacitor of the AIoT device.

A determination may be made (at block 820) as to whether the available energy is less than the first threshold. As described above, the first threshold may be a power level below which the device may not be able to fully operate the device's receiver and other internal circuitry related to the receiver's operation to receive a complete message. If the determination is positive, the process 800 may disable (at block 830) the transmitter and the receiver of the AIoT device. The AIoT device may transition to the AIoT State 1, as described below with reference to FIG. 9. The process 800 may return to block 815, which was described above.

If the determination is negative at block 820, a determination may be made (at block 825) as to whether the available energy is less than the second threshold plus the first threshold. As described above, the second threshold may be a power level below which the device may not be able to fully operate the device's transmitter and other internal circuitry related to the transmitter operation to transmit a complete message at a certain power level. If the determination is negative, the process 800 may proceed to block 805, which was described above. Otherwise, the process 800 may disable (at block 830) the transmitter and may enable the receiver of the AIoT device. The AIoT device may transition to the AIoT State 2, as described below with reference to FIG. 9. The process 800 may return to block 815, which was described above.

At block 840, the process 800 may set the value of Timer 1 to the value of the TimeToRechargeRx bits that were set in the transmitted message. The process 800 may set (at block 845) the value of Timer 2 to the value of the TimeToRechargeTx bits that were set in the transmitted message. A determination may be made (at block 847) as to whether Timer 1 is null. If the determination is negative, the process 800 may proceed to block 850, which is described below.

Otherwise, a determination may be made (at block 852) as to whether the value of Timer 2 is null. If the determination is positive, the process 800 may return to block 805, which was described above. Otherwise, a determination may be made (at block 855) as to whether the value of Timer 2 is zero. If the determination is positive, the process 800 may return to block 805, which was described above. Otherwise, the process 800 may set Timer 2 to the value of Timer 2. The process 800 may start (at block 860) Timer 2. The process 800 may then proceed to block 882, which is described below.

At block 850, a determination may be made as to whether the value of Timer 1 is zero. If the determination is positive, the process 800 may proceed to block 852, which was described above. Otherwise, the process 800 may set (at block 862) Timer 1 to the value of Timer 1. The process 800 may start (at block 865) Timer 1. The process 800 may set (at block 867) Timer 2 to the value of Timer 2 plus the value of Timer 1. The process 800 may start (at block 870) Timer 2.

At block 872, the process 800 may disable the transmitter and the receiver of the AIoT device. The AIoT device may transition to the Shared State 1, which is described below with reference to FIG. 9. A determination may be made (at block 875) as to whether Timer 1 has expired. If the determination is negative, the process 800 may return to block 875 to wait for Timer 1 to expire. Otherwise, the value of $1^{st}$\_Measured\_Energy parameter may be set (at block 877) to the energy available from the device's power source.

A determination may be made (at block 880) as to whether the value of the $1^{st}$\_Measured\_Energy parameter is less than the first threshold. If the determination is positive, the process 800 may process to block 872, which was described above. Otherwise, the process 800 may disable (at block 882) the transmitter and may enable the receiver of the AIoT device. The AIoT device may transition to the Shared State 2, which is described below with reference to FIG. 9.

A determination may be made (at block 885) as to whether Timer 2 has expired. If the determination is negative, the process 800 may return to block 885 to wait for Timer 2 to expire. Otherwise, the value of $2^{nd}$\_Measured\_Energy parameter may be set (at block 887) to the value of the energy available from the device's power source.

A determination may be made (at block 890) as to whether the value of the $2^{nd}$\_Measured\_Energy parameter is less than the first threshold. If the determination is positive, the process 800 may process to block 872, which was described above. Otherwise, a determination may be made (at block 892) as to whether the value of the $2^{nd}$\_Measured\_Energy parameter is greater than the second threshold plus the first threshold. If the determination is negative, the process 800 may return to block 882, which was described above. Otherwise, the process 800 may return to block 805, which was described above.

Figure 9:
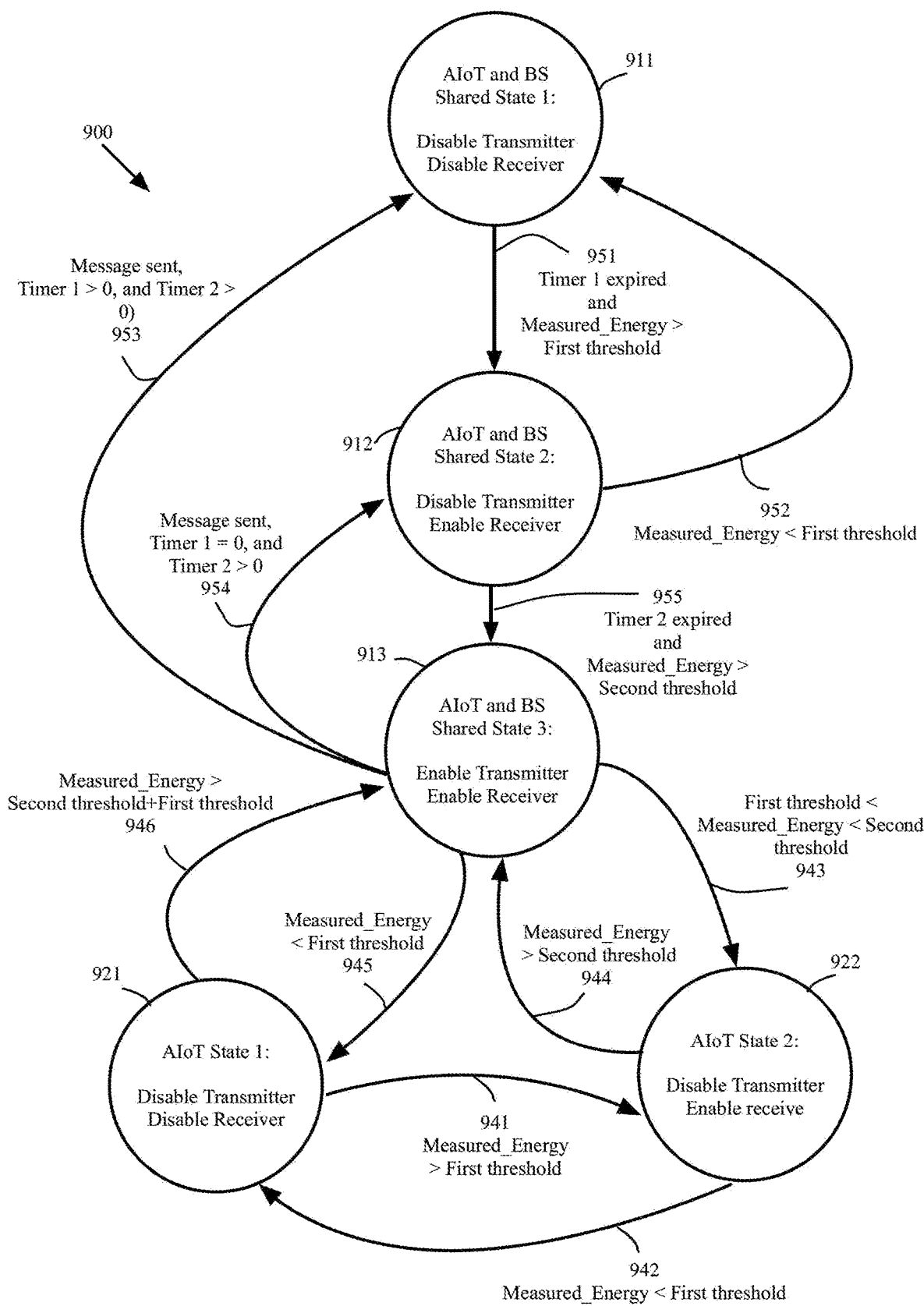
FIG. 9 is a state diagram of an AIoT device for managing the enabling and disabling of the device's transmitter and receiver, according to an example implementation of the present disclosure.

FIG. 9 is a state diagram 900 of an AIoT device for managing the enabling and disabling of the device's transmitter and receiver, according to an example implementation of the present disclosure. The processor of the AIoT may manage the enabling and disabling of the device's transmitter and receiver by tracking the status of Timer 1, Timer 2, performing message transmission, and the level of energy of the device's energy storage capacitor.

With reference to FIG. 9, when the level of energy stored in the capacitor exceeds the level of the first threshold, the state machine may transition from the first AIoT state 921 to the second AIoT state 922, as shown by the arrow 941. Upon the entry to the second AIoT state 922, the AIoT device may enable the receiver and may disable the transmitter.

When the level of energy exceeds the level of the first threshold plus the second threshold, the state machine may transition from the first AIoT state 921 to the third AIoT and BS shared state 913 as shown by the arrow 946. Upon the entry to the third AIoT and BS shared state 913, the AIoT device may enable the device's receiver and transmitter.

When the level of energy exceeds the level of the second threshold, the state machine may transition from the second AIoT state 922 to the third AIoT and BS shared state 913 as shown by the arrow 944. Upon the entry to the third AIoT and BS shared state 913, the AIoT device may enable the device's receiver and may enable the device's the transmitter.

When the state machine is in the second AIoT state 922 and level of energy does not exceed the level of first threshold, the state machine may transition from the second AIoT state 922 to the first AIoT state 921 as shown by the arrow 942. Upon the entry to the first AIoT state 921, the AIoT device may disable the device's receiver and transmitter.

When the state machine is in the third AIoT and BS shared state 913 and the level of energy does not exceed the level of first threshold, the state machine may transition from the third AIoT and BS shared state 913 to the first AIoT state 921 as shown by the arrow 945. Upon the entry to the first AIoT state 921, the AIoT device may disable the device's receiver and transmitter.

When the level of energy exceeds the level of first threshold and the level of energy does not exceed the level of second threshold, the state machine may transition from the third AIoT and BS shared state 913 to the second AIoT state 922, as shown by the arrow 942. Upon the entry to the second AIoT state 922, the AIoT device may enable the receiver and may disable the transmitter.

When a message has been sent, Timer 1 is greater than zero, and Timer 2 is greater than zero, the state machine may transition from the third AIoT and BS shared state 913 to the first AIoT and BS shared state 911 as shown by the arrow 953. Upon the entry to the first AIoT and BS shared state 911, the AIoT device may disable device's the receiver and transmitter.

When a message has been sent, Timer 1 is zero, and Timer 2 is greater than zero, the state machine may transition from third AIoT and BS shared state 913 to the second AIoT and BS shared state 912, as shown by the arrow 954. Upon the entry to the second AIoT and BS shared state 912, the AIoT device may enable the device's receiver and may disable the device's transmitter.

When Timer 1 has expired and the level of energy exceeds the level of the first threshold, the state machine may transition from the first AIoT and BS shared state 911 to the second AIoT and BS shared state 912, as shown by the arrow 951. Upon the entry to the second AIoT and BS shared state 912, the AIoT device may enable the device's receiver and disable the device's the transmitter.

When Timer 2 has expired and the level of energy exceeds the level of the second threshold, the state machine may transition from the second AIoT and BS shared state 912 to the third AIoT and BS shared state 913 as shown by the arrow 955. Upon the entry to the third AIoT and BS shared state 913, the AIoT device may enable the device's receiver and transmitter.

When the level of energy does not exceed the level of a first threshold, the state machine may transition from the second AIoT and BS shared state 912 to the first AIoT and BS shared state 911 as shown by the arrow 952. Upon the entry to the first AIoT and BS shared state 911, the AIoT device may disable the device's receiver and transmitter.

Figure 10:
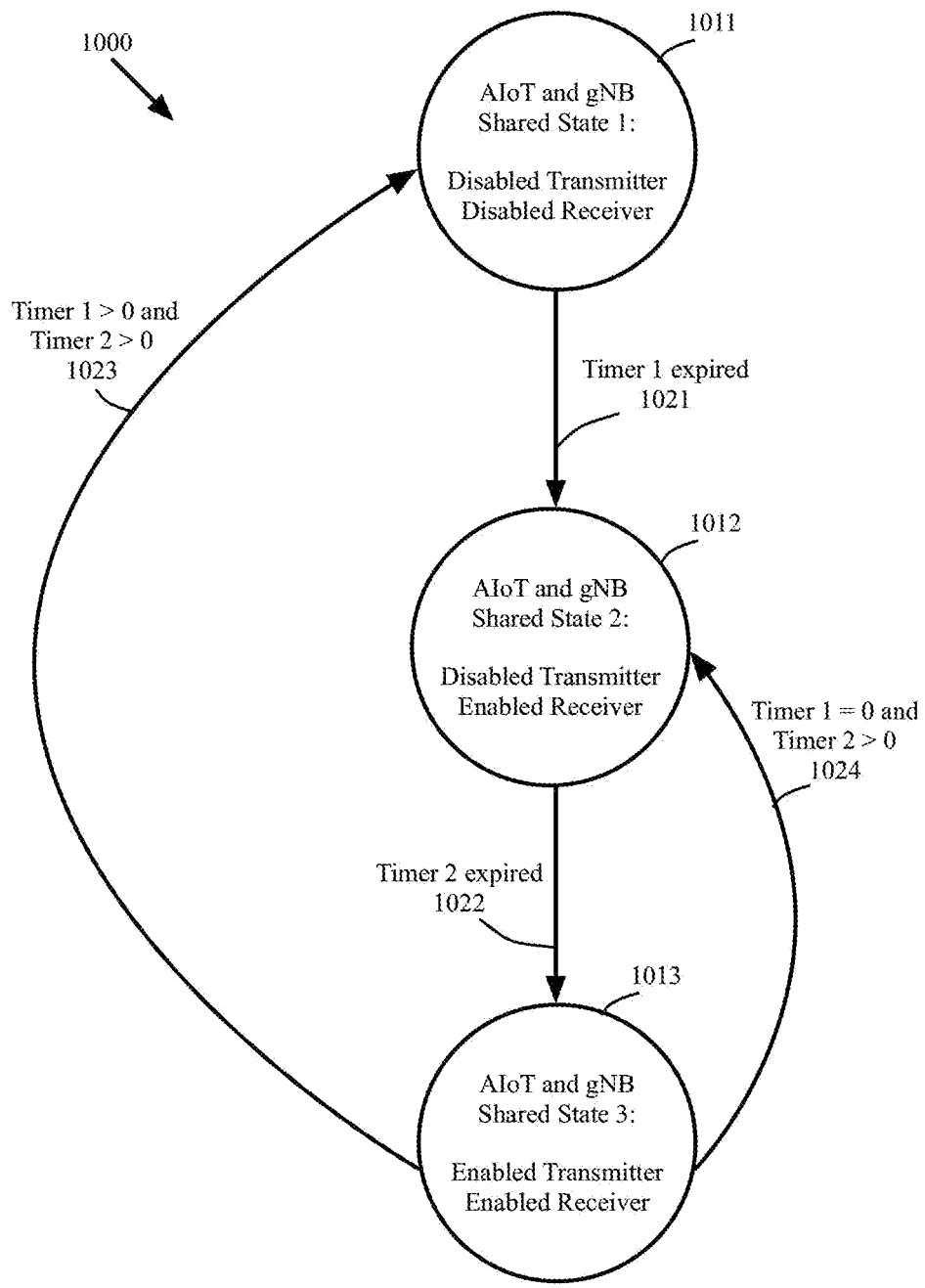
FIG. 10 is a state diagram of a BS for tracking the state of an AIoT device's transmitter and receiver, according to an example implementation of the present disclosure.

FIG. 10 is a state diagram 1000 of a BS for tracking the state of an AIoT device's transmitter and receiver, according to an example implementation of the present disclosure. The processor of the BS may track the state of the AIoT device's transmitter and receiver by tracking the status of Timer 1, Timer 2, and the level of energy in the device's energy storage capacitor.

With reference to FIG. 10, when a message has been sent, Timer 1 is greater than zero, and Timer2 is greater than zero, the state machine may transition from the third AIoT and BS shared state 1013 to the first AIoT and BS shared state 1011, as shown by the arrow 1023. Upon the entry to the first AIoT and BS shared state 1011, the BS may set the status of the AIoT device's receiver and transmitter to disabled.

When a message has been sent, Timer 1 is equal to zero, and Timer 2 is greater than zero, the state machine may transition from the third AIoT and BS shared state 1013 to the second AIoT and BS shared state 1012, as shown by the arrow 1024. Upon the entry to the second AIoT and BS shared state 1012, the BS may set the status of the AIoT device's receiver to enabled and the status of the AIoT device's transmitter to disabled.

When Timer 1 has expired and the level of energy exceeds the level of the first threshold, the state machine may transition from the first AIoT and BS shared state 1011 to the second AIoT and BS shared state 1012, as shown by the arrow 1021. Upon the entry to the second AIoT and BS shared state 1012, the BS may set the status of the AIoT device's receiver to enabled and the status of the AIoT device's transmitter to disabled.

When Timer_2 has expired and the level of energy exceeds the level of the second threshold, the state machine may transition from the second AIoT and BS shared state 1012 to the third AIoT and BS shared state 1013, as shown by the arrow 1022. Upon the entry to the third AIoT and BS shared state 1013, the BS may set the status of the AIoT device's receiver and transmitter to enabled With reference to the state diagrams of FIGS. 9 and 10, the states of the first AIoT and BS shared state, the second AIoT and BS shared state, and the third AIoT and BS shared state are common to AIoT device state machine 900 and the BS state machine 1000. It may be observed that the shared states are aligned with respect to the setting of the operational status of the AIoT device's transmitter and receiver. This common functional aspect of the state machines is based on the timers TimeToRecharge_RX (Timer 1) and TimeToRecharge_TX (Timer 2). As a result of this shared state set and shared timer values, the BS may be able to determine the current operation state of the AIoT device and its future operational states. Therefore, the BS may be able to optimize its transmission and reception resources, and the AIoT device may be able to conserve its energy resources.

Since the AIoT device's transmitter is enabled in the third AIoT and BS shared state, the AIoT device may be able to send the updated values of Timer 1 and Timer 2 to the BS when the AIoT sends a message to the BS in the third AIoT and BS shared state. The AIoT and the BS may, therefore, synchronize their status in the third AIoT and BS shared state.

Figure 11:
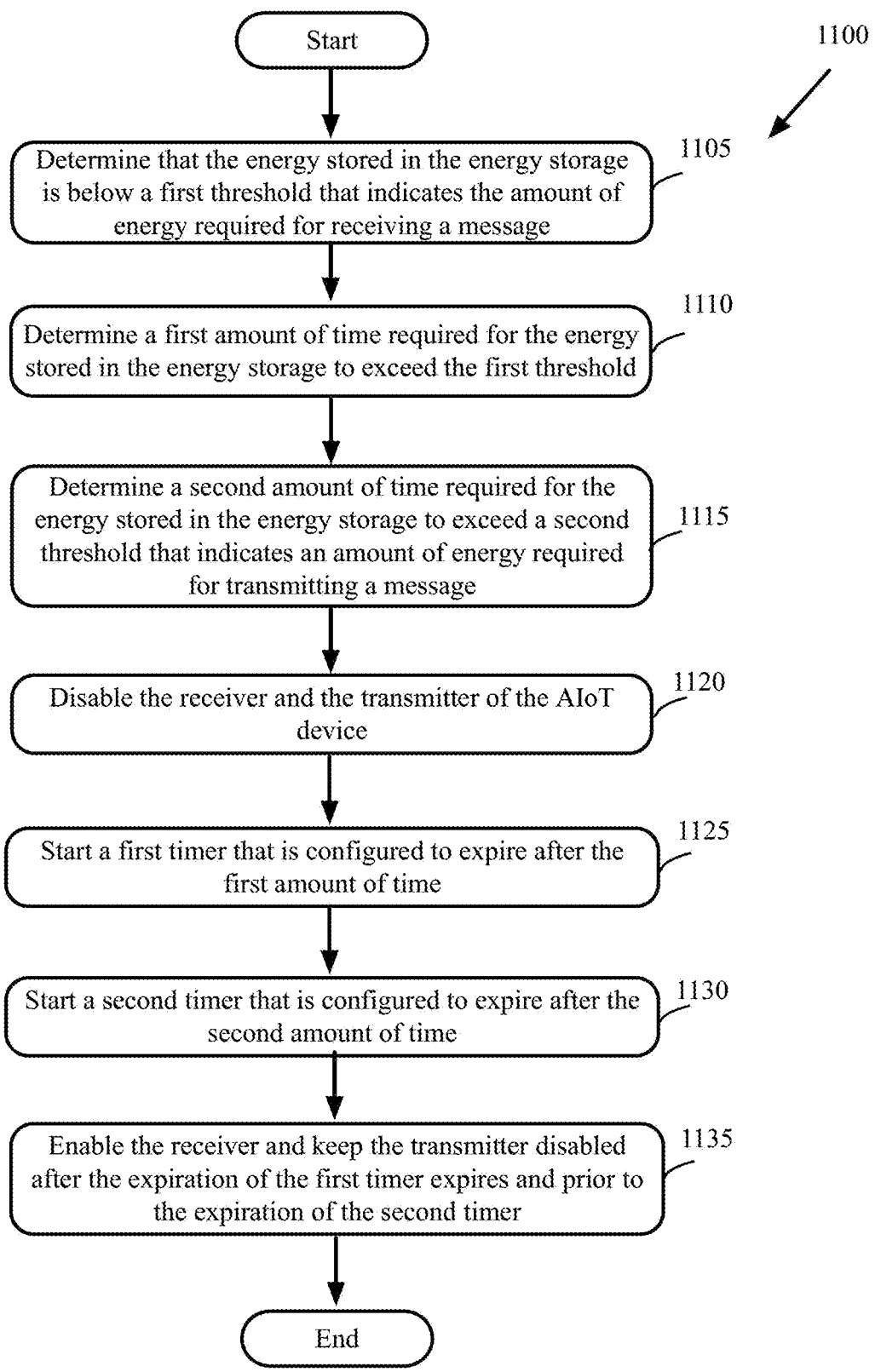
FIG. 11 is a flowchart illustrating an example method/process performed by a wireless terminal implementing the embodiments of FIGS. 8A-8C and 9-10, according to an example implementation of the present disclosure.

FIG. 11 is a flowchart illustrating an example method/process 1100 performed by a wireless terminal implementing the embodiments of FIGS. 8A-8C and 9-10, according to an example implementation of the present disclosure. With reference to FIG. 11, the process 1100 may be performed by at least one processor of any of the AIoT wireless terminals 101-104, shown in FIG. 1. The AIoT wireless terminal may include an energy harvesting component and an energy storage capacitor, as described below with reference to FIG. 12.

At block 1105, the process 1100 may determine that the energy stored in the energy storage is below a first threshold that indicates the amount of energy required for receiving a message. The process 1100 may determine (at block 1110) a first amount of time required for the energy stored in the energy storage to exceed the first threshold. The first threshold may indicate the amount of energy required for receiving a message. In some implementations, the first threshold may be configured to the AIoT device, at the time of manufacturing or through RRC (re) configuration.

The process 1100 may determine (at block 1115) a second amount of time required for the energy stored in the energy storage to exceed a second threshold that indicates an amount of energy required for transmitting a message. In some implementations, the second threshold may be configured to the AIoT device, at the time of manufacturing or through RRC (re) configuration.

The process 1100 may disable (at block 1120) the receiver and the transmitter of the AIoT device. The process 1100 may start a first timer (at block 1125) that is configured to expire after the first amount of time. The process 1100 may start a second timer (at block 1130) that is configured to expire after the second amount of time. The process 1100 may enable (at block 1135) the receiver and keep the transmitter disabled after the expiration of the first timer expires and prior to the expiration of the second timer. The process 1100 may then end.

In some implementations, enabling the receiver includes measuring the amount of energy stored in the energy storage after the expiration of the first timer. In a case that the measured amount of energy stored in the energy storage is above the first threshold, the receiver may be enabled. In a case that the measured amount of energy stored in the energy storage is not above the first threshold, the receiver may be enabled after a subsequent measurement of the amount of energy stored in the energy storage indicates that the stored energy is above the first threshold.

Figure 12:
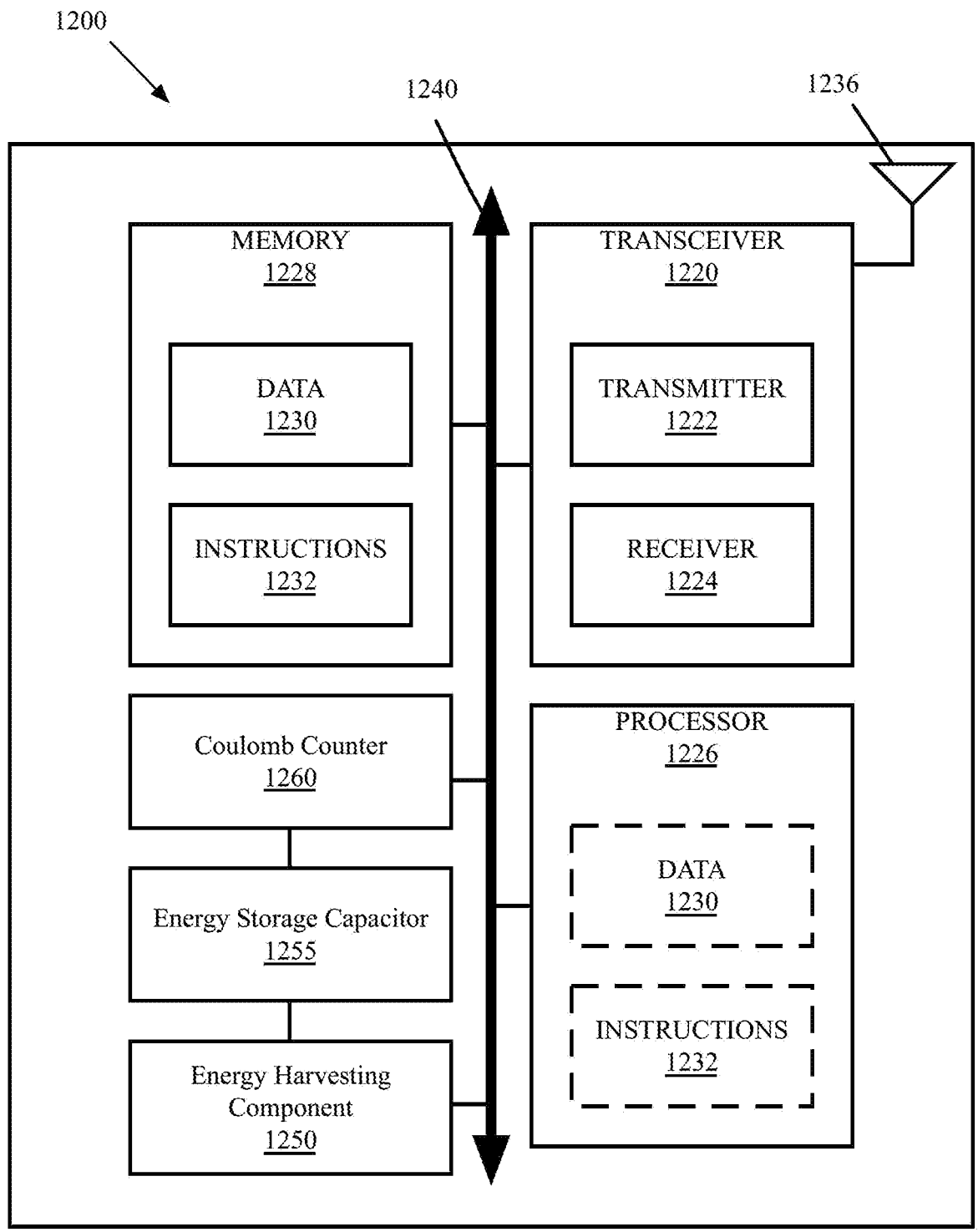
FIG. 12 illustrates a block diagram of an energy harvesting node for wireless communication according to an example implementation of the present disclosure.

In some implementations, the transmitter may be enabled after the expiration of the second timer. Enabling the transmitter may include measuring the amount of energy stored in the energy storage after the expiration of the second timer. In a case that the measured amount of energy stored in the energy storage is above the second threshold, the transmitter may be enabled. In a case that the measured amount of energy stored in the energy storage is not above the second threshold, the transmitter may be enabled after a subsequent measurement of the amount of energy stored in the energy storage indicates that the stored energy is above the second threshold FIG. 12 illustrates a block diagram of an energy harvesting node for wireless communication according to an example implementation of the present disclosure. The node 1200 may, for example, be an AIoT, such as the wireless terminals 101-104, shown in FIG. 1.

As shown in FIG. 12, the node 1200 may include transceiver 1220, processor 1226, memory 1228, at least one antenna 1236, an energy harvesting component 1250, an energy storage capacitor 125, and a Coulomb counter. The node 1200 may also include an RF spectrum band module, a base station communications module, a network communications module, and a system communications management module, input/output (I/O) ports, I/O components, and power supply (not explicitly shown in FIG. 12). Each of these components may be in communication with each other, directly or indirectly, over one or more buses 1240.

The transceiver 1220 having the transmitter 1222 and the receiver 1224 may be configured to transmit and/or receive time and/or frequency resource partitioning information. In some implementations, the transceiver 1220 may be configured to transmit in different types of subframes and slots including, but not limited to, usable, non-usable, and flexibly usable subframes and slot formats. The transceiver 1220 may be configured to receive data and control signaling.

The node 1200 may include a variety of computer-readable media. Computer-readable media may be any available media that may be accessed by node 1200 and include both volatile and non-volatile media, removable and non-removable media. By way of example, and not limitation, computer-readable media may include computer storage media and communication media. Computer storage media may include both volatile and non-volatile, removable and non-removable media implemented in any method or technology for storage of information, such as computer-readable instructions, data structures, program modules, or other data.

Computer storage media include RAM, ROM, EEPROM, flash memory, or other memory technology, such as optical disk storage, magnetic cassettes, magnetic tape, magnetic disk storage, or other magnetic storage devices. Computer storage media do not include a propagated data signal. Communication media typically embody computer-readable instructions, data structures, program modules, or other data in a modulated data signal, such as a carrier wave, or other transport mechanism and includes any information delivery media. The term "modulated data signal" means a signal that has one or more of its characteristics set or changed in such a manner as to encode information in the signal. By way of example, and not limitation, communication media include wired media, such as a wired network or direct-wired connection, and wireless media, such as acoustic, RF, infrared, and other wireless media. Combinations of any of the above should also be included within the scope of computer-readable media.

The memory 1228 may include computer-storage media in the form of volatile and/or non-volatile memory. The memory 1228 may be removable, non-removable, or a combination thereof. Exemplary memory includes solid-state memory, hard drives, optical-disc drives, etc. As illustrated in FIG. 12, the memory 1228 may store computer-readable, computer-executable instructions 1232 (e.g., software codes) that are configured to, when executed, cause the processor 1226 to perform various functions described herein, for example, some of the function described with reference to FIGS. 1 through 6. Alternatively, the instructions 1232 may not be directly executable by processor 1226 but be configured to cause the node 1200 (e.g., when compiled and executed) to perform various functions described herein.

The processor 1226 may include an intelligent hardware device, for example, a central processing unit (CPU), a microcontroller, an ASIC, etc. The processor 1226 may include memory. The processor 1226 may process data 1230 and instructions 1232 received from the memory 1228, and information through the transceiver 1220, the baseband communications module, and/or the network communications module. The processor 1226 may also process information to be sent to the transceiver 1220 for transmission through the antenna 1236, to the network communications module for transmission to a core network.

The node 1200 may include an energy harvesting component 1250, which may be configured to harvest energy from the environment. The node 1200 may use the energy harvested from the environment in lieu of a dedicated internal power source, such as a battery. The energy harvesting component 1250 may be configured to harvest energy from one or more sources, such as, radio waves, solar, light, motion, vibration, heat, pressure, etc. For example, energy harvesting component 1250 may include a radio wave antenna (which may be the same as the antenna 1236 or may be a different antenna) to receive radio waves from the environment and to harvest energy from the received radio waves. As another example, the energy harvesting component 1250 may include one or more solar cells to harvest solar energy or harvest energy from the ambient light. As another example, the energy harvesting component 1250 may include one or more transducers to generate energy from motion, vibration, heat, pressure, etc.

The node 1200 may include one or more energy storage units, such as the energy storage capacitor 1255, to store energy harvested by the energy harvesting component 1250. The processor 1226 may be configured to determine the level of energy stored in the energy storage capacitor 1255. For example, the processor may receive one or more bits from the Coulomb counter to indicate the charge level of the energy storage capacitor 1255.

Figure 13:
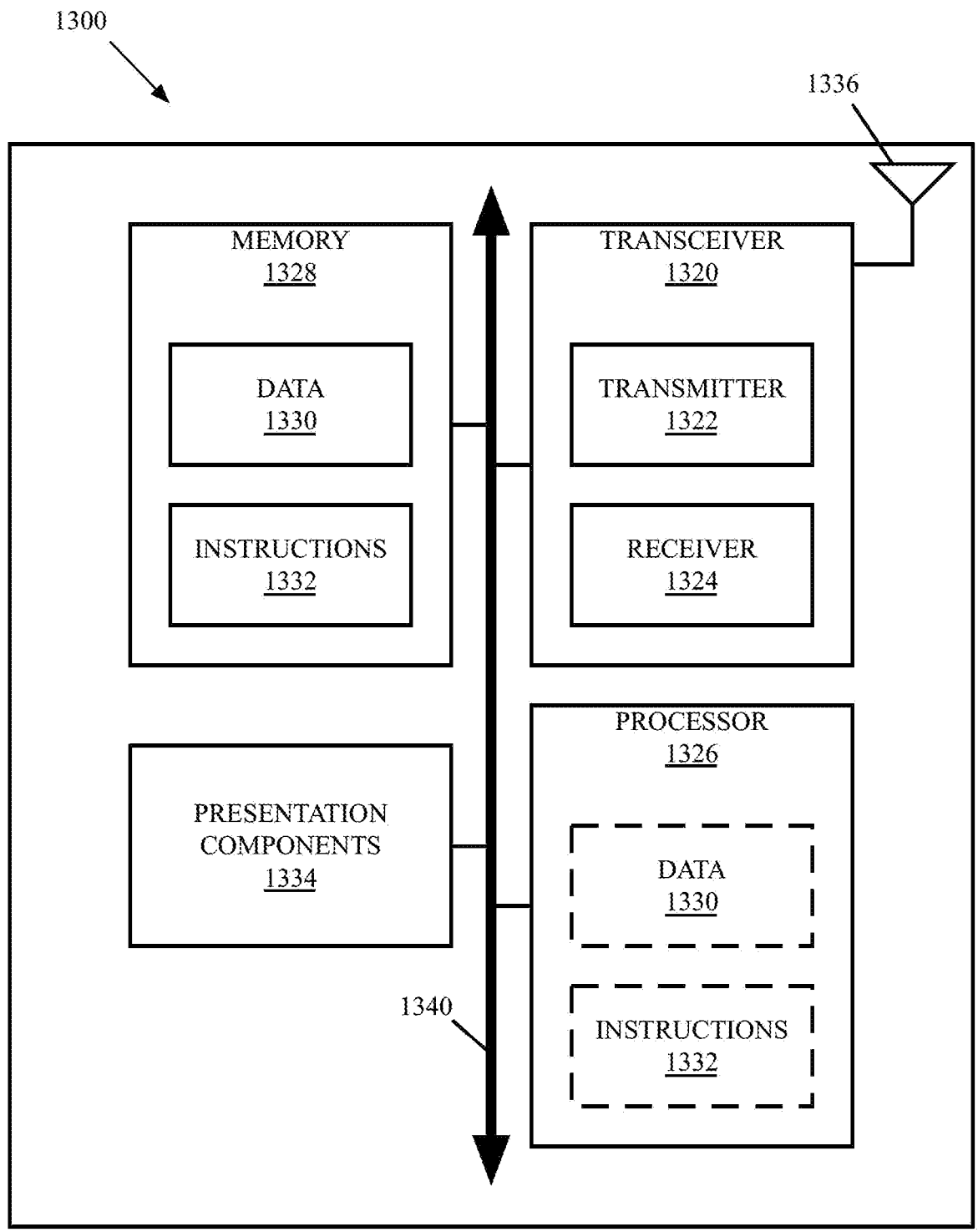
FIG. 13 illustrates a block diagram of a node for wireless communication, according to an example implementation of the present disclosure.

FIG. 13 illustrates a block diagram of a node for wireless communication according to an example implementation of the present disclosure. The node 1300 may, for example, be a UE, such as the UE 105 of FIG. 1. As shown in FIG. 13, the node 1300 may include transceiver 1320, processor 1326, memory 1328, one or more presentation components 1334, and at least one antenna 1336. The node 1300 may also include an RF spectrum band module, a base station communications module, a network communications module, and a system communications management module, input/output (I/O) ports, I/O components, and power supply (not explicitly shown in FIG. 13). Each of these components may be in communication with each other, directly or indirectly, over one or more buses 1340.

The transceiver 1320 having the transmitter 1322 and the receiver 1324 may be configured to transmit and/or receive time and/or frequency resource partitioning information. In some implementations, the transceiver 1320 may be configured to transmit in different types of subframes and slots including, but not limited to, usable, non-usable, and flexibly usable subframes and slot formats. The transceiver 1320 may be configured to receive data and control signaling.

The node 1300 may include a variety of computer-readable media. Computer-readable media may be any available media that may be accessed by the node 1300 and include both volatile and non-volatile media, removable and non-removable media. By way of example, and not limitation, computer-readable media may include computer storage media and communication media. Computer storage media may include both volatile and non-volatile, removable and non-removable media implemented in any method or technology for storage of information, such as computer-readable instructions, data structures, program modules, or other data.

Computer storage media include RAM, ROM, EEPROM, flash memory, or other memory technology, CD-ROM, digital versatile disks (DVD), or other optical disk storage, magnetic cassettes, magnetic tape, magnetic disk storage, or other magnetic storage devices. Computer storage media do not include a propagated data signal. Communication media typically embody computer-readable instructions, data structures, program modules, or other data in a modulated data signal, such as a carrier wave, or other transport mechanism and includes any information delivery media. The term "modulated data signal" means a signal that has one or more of its characteristics set or changed in such a manner as to encode information in the signal. By way of example, and not limitation, communication media include wired media, such as a wired network or direct-wired connection, and wireless media, such as acoustic, RF, infrared, and other wireless media. Combinations of any of the above should also be included within the scope of computer-readable media.

The memory 1328 may include computer-storage media in the form of volatile and/or non-volatile memory. The memory 1328 may be removable, non-removable, or a combination thereof. Exemplary memory includes solid-state memory, hard drives, optical-disc drives, etc. As illustrated in FIG. 13, the memory 1328 may store computer-readable, computer-executable instructions 1332 (e.g., software codes) that are configured to, when executed, cause the processor 1326 to perform various functions described herein, for example, some of the function described with reference to FIGS. 1 through 6. Alternatively, the instructions 1332 may not be directly executable by processor 1326 but be configured to cause the node 1300 (e.g., when compiled and executed) to perform various functions described herein.

The processor 1326 may include an intelligent hardware device, for example, a central processing unit (CPU), a microcontroller, an ASIC, etc. The processor 1326 may include memory. The processor 1326 may process data 1330 and instructions 1332 received from the memory 1328, and information through the transceiver 1320, the baseband communications module, and/or the network communications module. The processor 1326 may also process information to be sent to the transceiver 1320 for transmission through the antenna 1336, to the network communications module for transmission to a core network.

One or more presentation components 1334 may present data indications to a person or other device. For example, one or more presentation components 1334 include a display device, speaker, printing component, vibrating component, etc.

From the above description, it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. An energy harvesting electronic device, comprising:
   an energy storage device configured to store energy harvested by the electronic device;
   one or more non-transitory computer-readable media storing one or more computer-executable instructions; and
   at least one processor coupled to the one or more non-transitory computer-readable media, and configured to execute the one or more computer-executable instructions to cause the electronic device to:
   determine that the electronic device has a first message to transmit to another electronic device;
   determine that the energy storage device has enough energy required for transmitting the first message;
   determine a first amount of time required for the energy storage device to store an amount of energy required for receiving a second message from the other electronic device after transmitting the first message;
   include, in a case that the first amount of time is greater than zero, a value in the first message that is at least equal to the first amount of time;
   include, in a case that the first amount of time is zero, an indication in the first message that the electronic device has enough energy required for receiving the second message; and
   transmit the first message to the other electronic device, wherein in the case that the first amount of time is greater than zero, the energy harvesting electronic device receives the second message from the other electronic device after at least the first amount of time has passed.

2. The electronic device of claim 1 further comprising receiver circuitry, wherein the at least one processor is further configured to execute the one or more computer-executable instructions to cause the electronic device to:
   disable the receiver circuitry for at least the first amount of time in the case that the first amount of time is greater than zero.

3. The electronic device of claim 1, wherein including the value that is at least equal to the first amount of time in the first message comprises:
   selecting, from a plurality of enumerated time values, an enumerated time value that is at least equal to the first amount of time; and
   setting a plurality of bits in the first message to indicate the selected enumerated time value.

4. The electronic device of claim 3, wherein including the indication in the first message that the electronic device has enough energy required for receiving the second message comprises:
not including any of the plurality of bits in the first message.

5. The electronic device of claim 3, wherein including the indication in the first message that the electronic device has enough energy required for receiving the second message comprises:
selecting an enumerated time value, from the plurality of enumerated time values, that includes a zero amount of time; and
setting the plurality of bits to indicate the selected enumerated time value.

6. The electronic device of claim 3, wherein:
the plurality of bits is a first plurality of bits,
the selected enumerated time value is a first enumerated time value,
the plurality of enumerated time values is a first plurality of enumerated time values, and
the at least one processor is further configured to execute the one or more computer-executable instructions to cause the electronic device to:
determine a second amount of time required for the energy storage device to store an amount of energy required for transmitting a third message after transmitting the first message;
select a second enumerated time value from a second plurality of enumerated time values that is at least equal to the second amount of time;
set a second plurality of bits in the first message to indicate the second enumerated time value; and
wherein transmitting the first message to the other electronic device comprises:
determining whether prioritization is required for transmitting the first and second plurality of bits;
in a case that the prioritization is required, removing the second plurality of bits from the first message prior to transmitting the first message; and
in a case that the prioritization is not required, leaving the second plurality of bits in the first message.

7. The electronic device of claim 3, wherein the plurality of enumerated time values is configured to the electronic device at a time of manufacturing the electronic device.

8. The electronic device of claim 3, wherein the at least one processor is further configured to execute the one or more computer-executable instructions to cause the electronic device to:
receive a configuration message comprising updated values for the plurality of enumerated time values.

9. The electronic device of claim 1, wherein the at least one processor is further configured to execute the one or more computer-executable instructions to cause the electronic device to:
determine a second amount of time required for the energy storage device to store an amount of energy required for transmitting a third message after receiving the second message;
in a case that the second amount of time is greater than zero, include a value that is at least equal to the second amount of time in the first message; and
in a case that the second amount of time is zero, include an indication in the first message that the electronic device has enough energy required for transmitting the third message after transmitting the first message.

10. The electronic device of claim 9, further comprising:
transmitter circuitry,
wherein the at least one processor is further configured to execute the one or more computer-executable instructions to cause the electronic device to:
disable the transmitter circuitry for at least the second amount of time in the case that the second amount of time is greater than zero.

11. The electronic device of claim 9, wherein including the value that is at least equal to the second amount of time in the first message comprises:
selecting, from a plurality of enumerated time values, an enumerated time value that is at least equal to the second amount of time; and
setting a plurality of bits in the first message to indicate the selected enumerated time value.

12. The electronic device of claim 11, including the indication in the first message that the electronic device has enough energy required for transmitting the third message after transmitting the first message comprises:
not including any of the plurality of bits in the first message.

13. The electronic device of claim 11, including the indication in the first message that the electronic device has enough energy required for transmitting the third message after transmitting the first message comprises:
selecting an enumerated time value, from the plurality of enumerated time values, that indicates a zero amount of time; and
setting the plurality of bits in the first message to indicate the selected enumerated time value.

14. The electronic device of claim 1, wherein:
the energy storage device comprises a capacitor,
the electronic device is an ambient Internet of things (AIOT) device,
the other electronic device is one of a base station (BS) and a user equipment (UE), and
the other electronic device is configured not to transmit any messages to the energy harvesting electronic device for at least the first amount of time in the case that the first amount of time is greater than zero.

15. A method performed by an energy harvesting electronic device including an energy storage device, the method comprising:
determining that a first message is available to be transmitted to another device;
determining that the energy storage device has enough energy required for transmitting the first message;
determining a first amount of time required for the energy storage device to store an amount of energy required for receiving a second message from the other electronic device after transmitting the first message;
in a case that the first amount of time is greater than zero, including a value that is at least equal to the first amount of time in the first message;
in a case that the first amount of time is zero, including an indication in the first message that the electronic device has enough energy required for receiving the second message, and
transmitting the first message to the other electronic device, wherein in the case that the first amount of time is greater than zero, the energy harvesting device receives the second message from the other electronic device after at least the first amount of time has passed.

* * * * *